United States Patent
Huang et al.

(10) Patent No.: US 11,754,908 B2
(45) Date of Patent: Sep. 12, 2023

(54) DEVICES AND METHODS FOR GIANT SINGLE-PHOTON NONLINEARITIES

(71) Applicant: THE TRUSTEES OF THE STEVENS INSTITUTE OF TECHNOLOGY, Hoboken, NJ (US)

(72) Inventors: Yuping Huang, Norwood, NJ (US); Jiayang Chen, Jersey City, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 0 days.

(21) Appl. No.: 18/096,500

(22) Filed: Jan. 12, 2023

(65) Prior Publication Data

US 2023/0168563 A1 Jun. 1, 2023

Related U.S. Application Data

(62) Division of application No. 17/468,182, filed on Sep. 7, 2021, now abandoned.

(60) Provisional application No. 63/075,004, filed on Sep. 4, 2020.

(51) Int. Cl.
  *G02F 1/365* (2006.01)
  *G02F 1/355* (2006.01)
  *G02F 1/35* (2006.01)

(52) U.S. Cl.
  CPC .............. *G02F 1/365* (2013.01); *G02F 1/353* (2013.01); *G02F 1/3556* (2013.01); *G02F 2202/20* (2013.01)

(58) Field of Classification Search
  CPC ........ G02F 1/353; G02F 1/3556; G02F 1/365; G02F 2202/20
  See application file for complete search history.

(56) References Cited

U.S. PATENT DOCUMENTS

| | | | |
|---|---|---|---|
| 10,996,538 B2 * | 5/2021 | Popovic | G02B 6/29338 |
| 2020/0285131 A1 * | 9/2020 | Marandi | G02F 1/39 |
| 2021/0080805 A1 * | 3/2021 | Srinivasan | G02F 1/3501 |

OTHER PUBLICATIONS

Lu et al., "Periodically poled thin-film lithium niobate microring resonators with a second-harmonic generation efficiency of 250,000%/W", Nov. 21, 2019, Optica vol. 6, No. 12, pp. 1455-1460. (Year: 2019).*

* cited by examiner

*Primary Examiner* — Daniel Petkovsek
(74) *Attorney, Agent, or Firm* — Lewis Roca Rothgerber Christie LLP

(57) ABSTRACT

A periodically poled microring resonator structure, a method for fabrication of the periodically poled microring resonator structure, and a method to achieve giant single-photon nonlinearity are disclosed. The strong single-photon nonlinearity in the microring resonator structure is achieved through its optimized design and fabrication procedures.

11 Claims, 23 Drawing Sheets

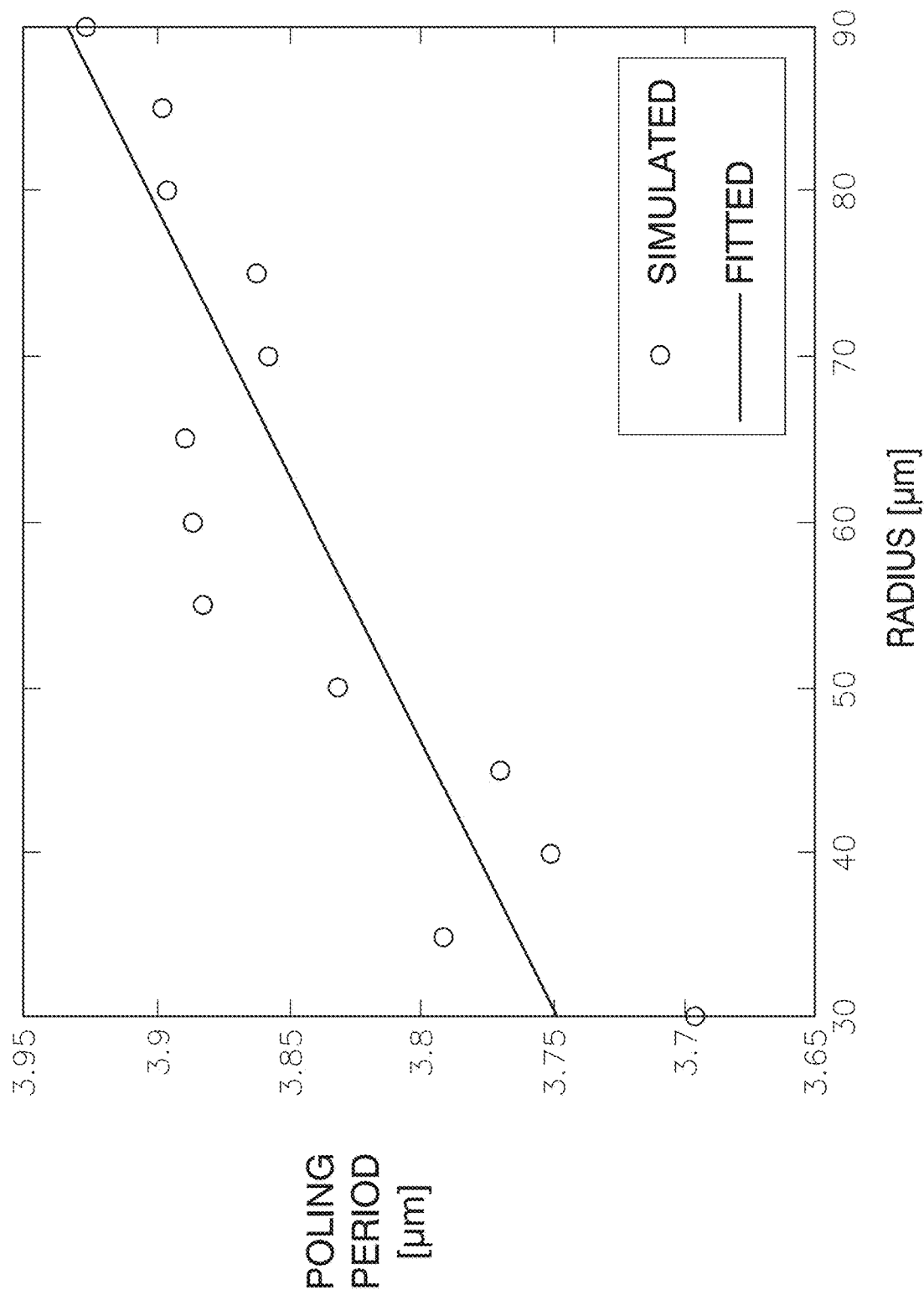

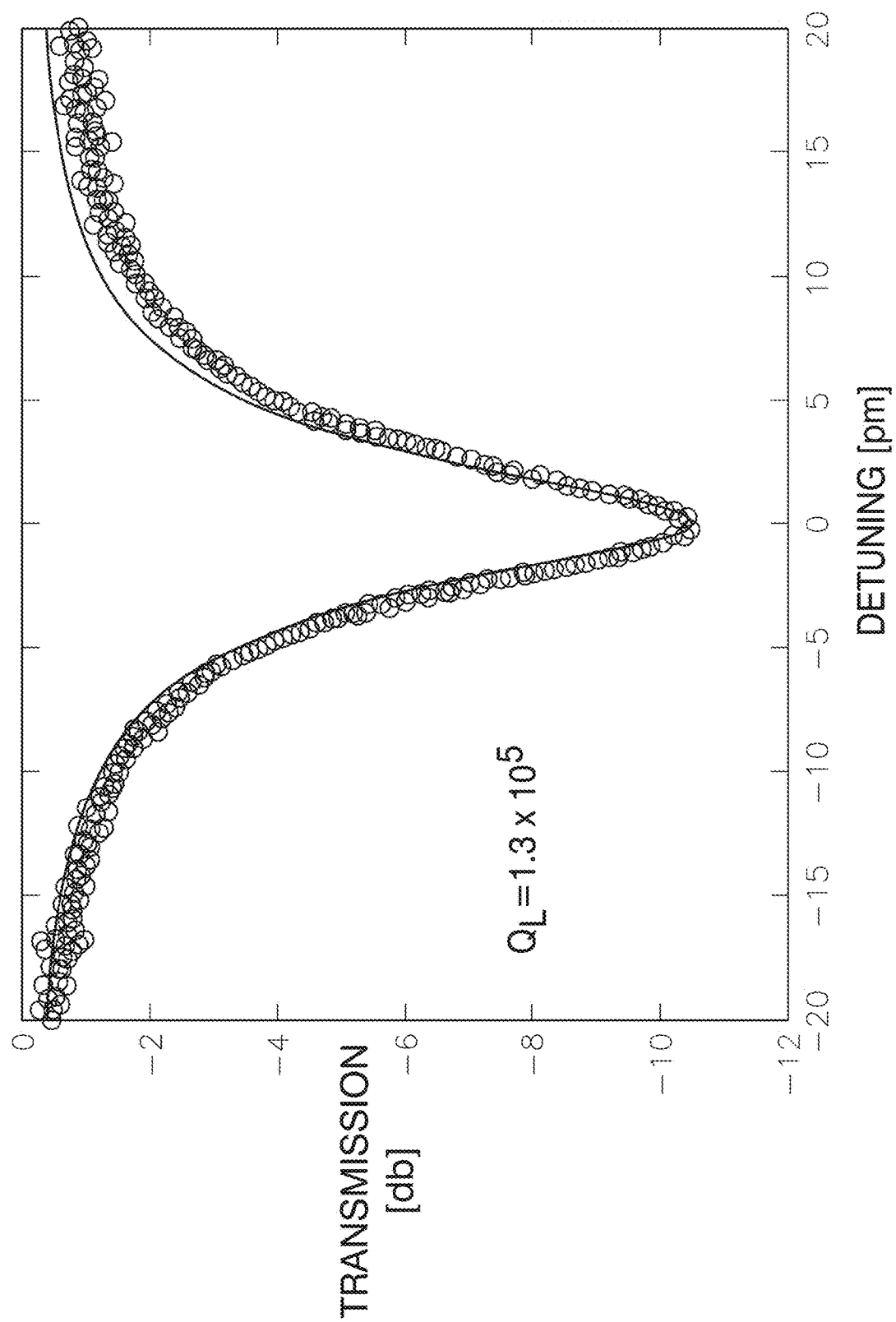

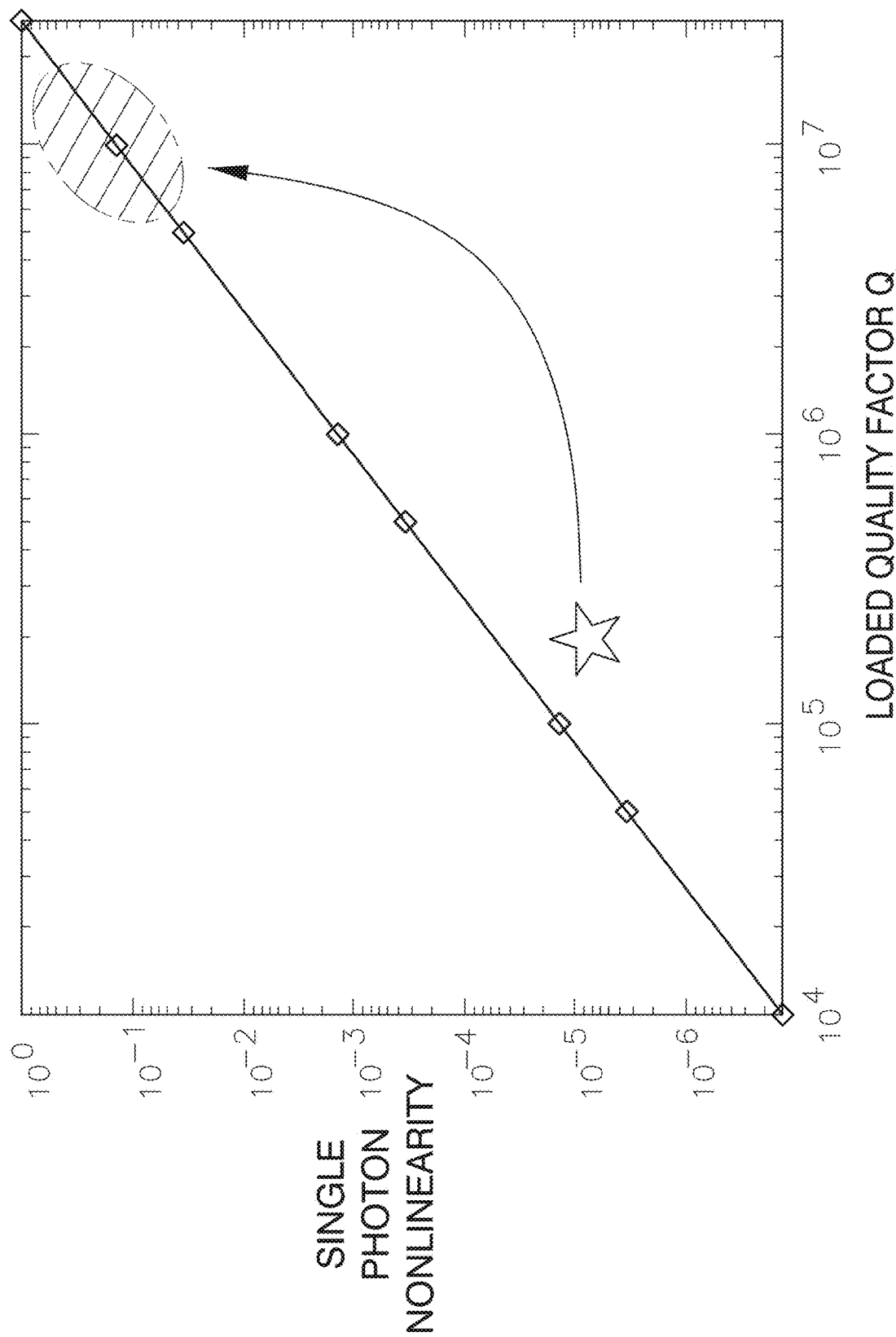

SPUTTER Cr HARD MASK

HSQ SPIN COATING ON TFLN

E-BEAM LITHOGRAPHY AND DEVELOP

Ar* MILLING PROCESS

HSQ REMOVAL AND CLEANING PROCESS

CHEMICAL MECHANICAL POLISHING (CMP)

Cr REMOVAL

CHEMICAL MECHANICAL POLISHING (CMP)

DEVICES AND METHODS FOR GIANT SINGLE-PHOTON NONLINEARITIES

CROSS-REFERENCE TO RELATED APPLICATION(S)

This application is a divisional of U.S. patent application Ser. No. 17/468,182 filed Sep. 7, 2021, which claims priority to U.S. Provisional Patent Application Ser. No. 63/075,004 filed Sep. 4, 2020, the entire disclosures of which are incorporated herein by reference.

FIELD OF THE INVENTION

The present invention relates to optical nonlinear and quantum photonic systems.

STATEMENT REGARDING FEDERALLY SPONSORED RESEARCH OR DEVELOPMENT

None.

BACKGROUND OF THE INVENTION

For quantum logical operations, superconductors, atoms, ions, and their equivalents are typically housed in near absolute zero temperature (i.e., at or below 1° Kelvin) or well-isolated, which adds significantly to the cost, size, operation overhead, and instabilities of such devices or systems. The present technologies using single emitters, such as single atoms, single ions, single color centers, and single quantum dots, are also bulky, heavy, high power-consuming, costly, and fragile to operate. As such, it is highly desirable to develop room temperature quantum processors with small footprints in size, weight, power, and cost.

SUMMARY

In contrast to those single-emitter based approaches, the inventive technology offers an approach to quantum logical operations at room-temperature and in ambient environments. It can be mass integrated on-chip, with exceptional footprint in Size, Weight, Power, and Cost (SWaP-C). It can lead to future device and system platforms for quantum information processing, including quantum computing, quantum simulation, and so on.

Strong optical nonlinearities, especially those realized in integrated photonic circuits, would enable a breadth of valuable classical and quantum optical applications, such as optical frequency synthesizers, optical clocks, spectroscopy, LiDAR, and quantum photonic computing. With high quality factor, small mode volume, and dispersion engineering capability, integrated photonic resonators, including, but not limited to, thin-film lithium niobate can lead to enhanced nonlinear interactions. In particular, second-order nonlinearities, e.g., $\chi^{(2)}$, in nonlinear optical materials, such as lithium niobate, are especially attractive for their much stronger nonlinear response compared to other higher-order processes, such as $\chi^{(3)}$ and $\chi^{(4)}$. Such second-order nonlinearities imply less required optical power and lower induced quantum noise to achieve large optical nonlinearities at a single photon level, as is essential for many quantum applications using optical signals at a single-photon level.

A sample approach for achieving giant nonlinearities between single photons using lithium niobate thin film or lithium niobate on insulator (LNOI), as a concrete example, is presented, but the same principle is applicable to other nonlinear optical materials. In an embodiment, the single-photon nonlinearity is realized in periodically-poled lithium niobate (PPLN) microring resonators, wherein a pump photon interacts with a signal photon in a PPLN microring resonator through $\chi^{(2)}$. The strong interaction is enabled by the optimal geometry design and high quality-factor cavity with small mode volume.

BRIEF DESCRIPTION OF THE DRAWINGS

For a more complete understanding of the present invention, reference is made to the following figures, in which:

FIG. 5A is a graph illustrating the calculated poling period for various radii of the microring.

FIG. 6A is a resonance spectrum of infrared quasi-TM00 modes around 1554.4 nm;

FIG. 7B is a graph illustrating calculated single-photon nonlinearity with various loaded quality factors;

DETAILED DESCRIPTION OF EXEMPLARY EMBODIMENTS

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

All terms defined herein should be afforded their broadest possible interpretation, including any implied meanings as dictated by a reading of the specification as well as any words that a person having skill in the art and/or a dictionary, treatise, or similar authority would assign thereto.

The terms, "for example", "e.g.", "optionally", as used herein, are intended to be used to introduce non-limiting examples. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." In addition, the terms "comprises" and "comprising" when used herein specify that certain features are present in that embodiment, however, this phrase should not be interpreted to preclude the presence or addition of additional steps, operations, features, components, and/or groups thereof.

Figure 1:
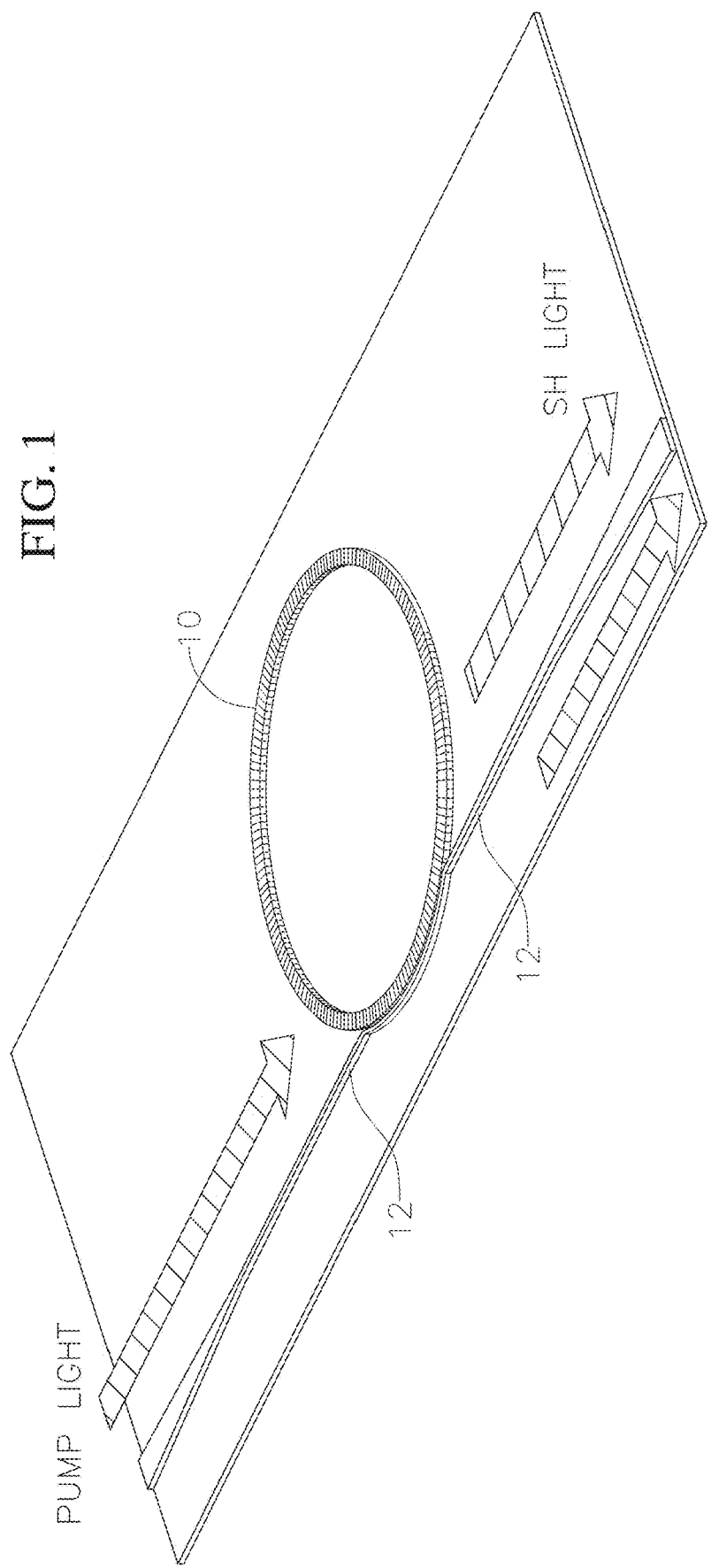
FIG. 1 is a schematic of a PPLN microring resonator in accordance with an embodiment of the present invention.

In an embodiment, a single-photon nonlinearity device constructed in accordance with the present invention is based on a periodical poled lithium niobate (PPLN) microring resonator, such as that shown in FIG. 1. In operation, pump light (e.g. 1550 nm) is coupled into the bus waveguide with tapered or inversed tapered coupler design for high coupling efficiency. Then, on-chip light enters into the microring resonator 10 through an optimal pulley-coupler (i.e., pulley waveguide) 12, which is designed for simultaneously obtaining good coupling for both the pump light and a generated new color of light (e.g., 775 nm). While pump light is circulating in the microring, its intensity will be built up due to cavity enhancement. Due to the second order nonlinearity $\chi^{(2)}$ in lithium niobate, strong pump light will experience the nonlinear optical response, thus creating a new frequency of light. According to the phase matching conditions and pump schemes, the nonlinear process could be second-harmonic generation (SHG), sum-frequency generation (SFG), difference-frequency generation (DFG), optical parametric amplification (OPA), and/or optical parametric oscillation (OPO) among others. To satisfy the phase matching condition, a periodical poling technique is introduced to compensate for wavevector mismatch between pump light and the generated light. By periodically exerting a high electric field (>20 kV/mm) across the lithium niobate thin film 14, the crystalline orientation of the microring 10 is alternatively pointing up and down with a specific period, as shown in FIG. 1.

Figure 2:
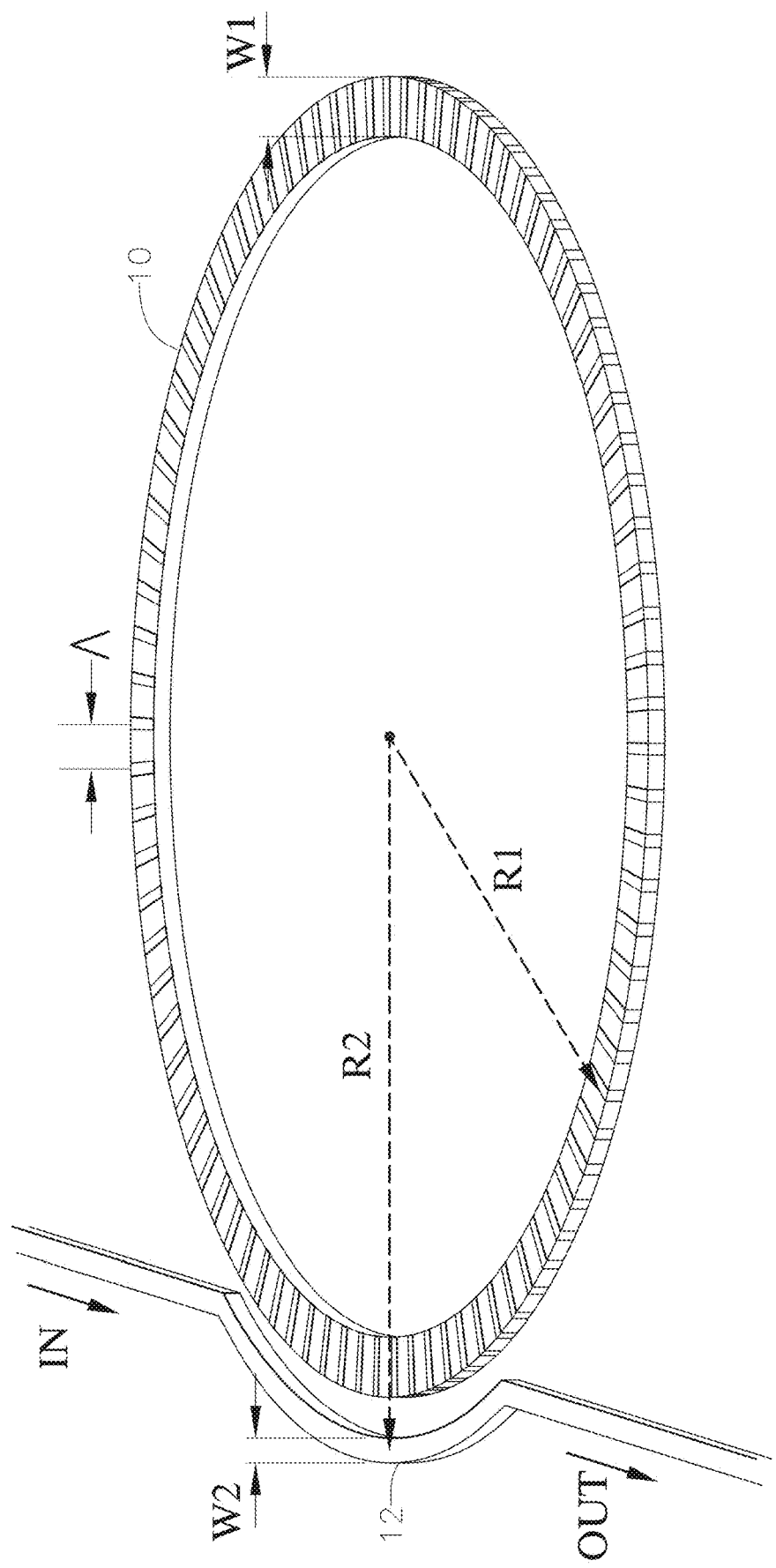
FIG. 2 is a schematic illustration showing design details of the PPLN microring resonator of FIG. 1.

The design details of the PPLN microring resonator 10 are shown in FIG. 2. R1 is the radius of the microring structure 10 to implement the optical cavity, while R2 is the radius of the pulley coupler 12 to couple light into and out from the cavity. W1 and W2 are the top widths of the microring waveguide 10 and the pulley waveguide 12, respectively, while Λ denotes the poling period. To maximize the $\chi^{(2)}$ effect in the microring 10, a Z-cut crystal orientation LNOI wafer 16 is used for its in-plane rotational symmetric nonlinear tensor. In contrast, for X-cut or Y-cut LNOI wafers, the microring would have limited performance due to its strict direction available for the optical nonlinear interaction. In the Z-cut microring case, using second harmonic generation for example, the single-photon nonlinearity, defined as the SHG efficiency produced by a single pump photon, is given as:

$$\eta_{photon} = \eta_{sh} \times \frac{\hbar\omega_1}{\tau} = \frac{|g|^2 Q_{1,i}^2 Q_{2,i}}{\hbar\omega_1^4} \times \frac{\hbar\omega_1}{\tau} = \frac{2Q_{1,i}Q_{2,i}}{\omega_1^2}|g|^2 = \frac{\omega_2}{\varepsilon_0 n_1^4 n_2^2} \frac{d_{eff}^2 \xi^2 Q_{1,i} Q_{2,i}}{V_{eff}} \quad (1)$$

$$g = \sqrt{\frac{\hbar\omega_1^2 \omega_2}{2\varepsilon_0 n_1^4 n_2^2}} \frac{d_{eff} \xi}{\sqrt{A_{eff} L}} \quad (2)$$

where $\eta_{photon}$ and $\eta_{sh}$ denote single-photon nonlinearity and SHG efficiency normalized to the pump power. $\omega_1$ and $\omega_2$, respectively denote the angular frequency of the pump light and SH light, respectively. τ gives the lifetime of the cavity pump mode. $Q_{1(2),i}$ denote intrinsic quality factors of pump and SH cavity modes, respectively. g gives the single-photon coupling strength, $\varepsilon_0$ gives vacuum permittivity, $n_1$ and $n_2$, respectively, give the effective refractive indices of pump and SH modes, $A_{eff}$ is the effective mode area, L is the perimeter of the microring 10, $d_{eff}$ is effective nonlinear tensor, and ξ is the mode cross-section overlapping factor between pump and SH cavity mode.

TABLE 1

Device Parameters to Achieve Giant Optical Nonlinearity at a single photon level.

| Intrinsic quality factor Q1, i | Intrinsic quality factor Q2, i | $\chi^{(2)}$ nonlinear tensor deff [pm/V] | Mode overlapping factor ξ | Effective Mode Volume Veff [μm³] | Single photon nonlinearity $\eta_{photon}$ |
|---|---|---|---|---|---|
| 3 × 10⁷ | 3 × 10⁷ | 27 × (2/π) | 90% | 345 | 1 |

Figure 3:
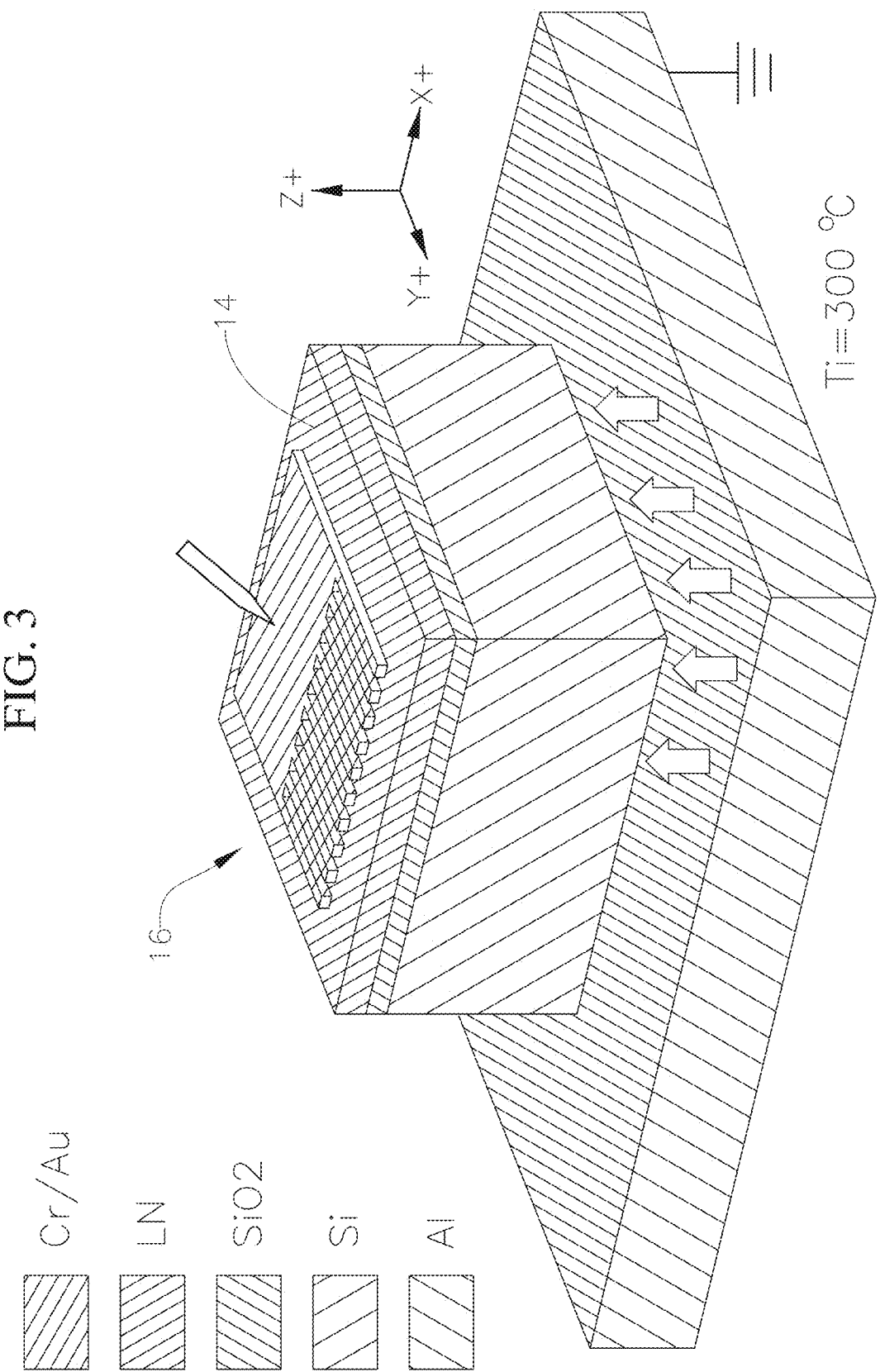
FIG. 3 is an illustration of periodical poling on Z-cut thin film lithium niobate on an insulator.

Table 1 shows the calculated single-photon nonlinearity with desirable microring parameters. Here, a factor of (2/π) is introduced to the optical nonlinearity due to a quasi-phase matching process, and the interacting optical modes are assumed to be critically coupled. As shown in Table 1, there are four requirements to be addressed to achieve single-photon nonlinearity. First, the quality factor (Q) of the microring needs to be optimized (>3×10⁷). In addition to mature nanofabrication techniques, a thick (>500 nm) lithium niobate layer is desirable to have better mode confinement and a larger bending radius (>50 μm) to avoid bending loss. Second, to utilize the largest nonlinear tensor $d_{33}$ (~27 pm/V) and maximize mode overlapping factor (>90%), the fundamental quasi-transverse-magnetic (quasi-TM00) cavity modes for all interacting lights will be required to be excited in the microring resonator 10. Third, to compensate for wavevector mismatch between the pump light and the generated light, an optimized periodical poling technique needs to be implemented, as shown in FIG. 3. Fourth, for efficient couple-in of the pump light and couple-out of the generated light, a pulley coupler 12 needs to be designed accordingly.

Figure 4B:
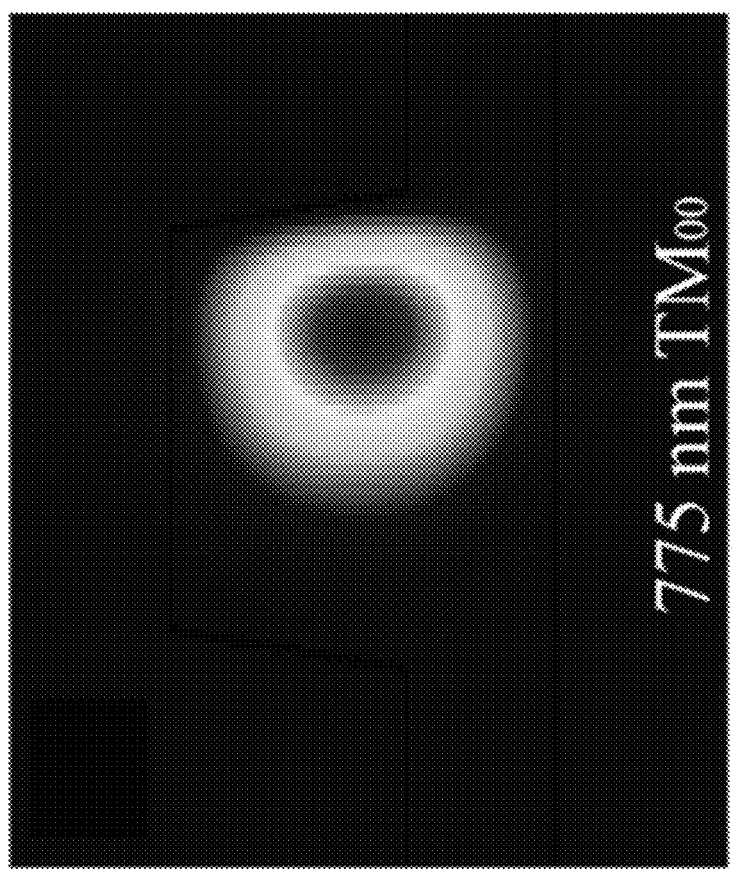
FIG. 4B shows a simulated visible quasi-TM00 mode profile.
Figure 4A:
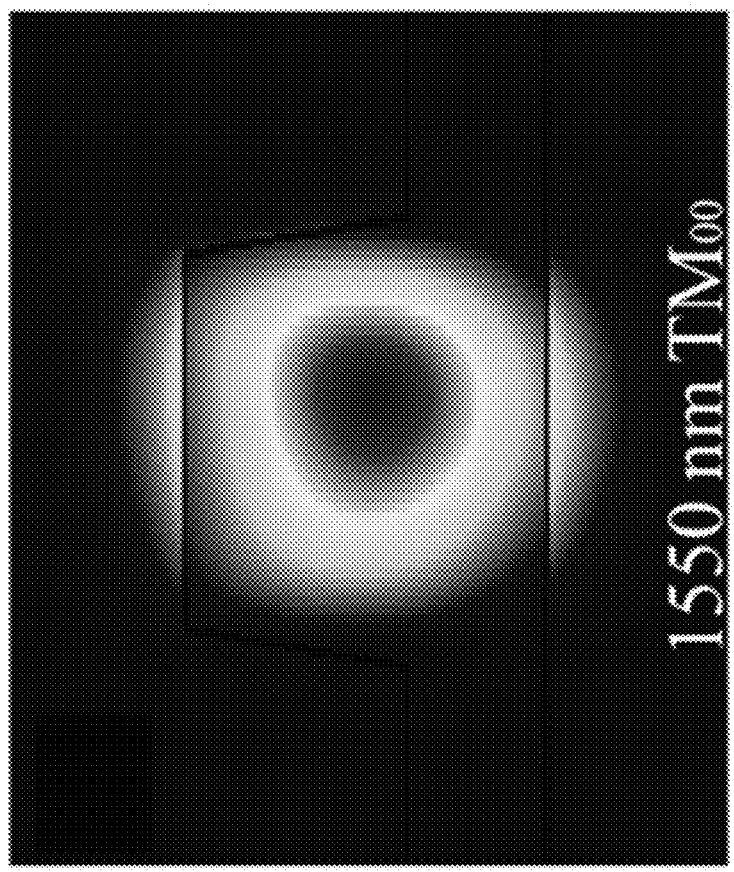
FIG. 4A shows a simulated infrared quasi-TM00 mode profile.
Figure 5B:
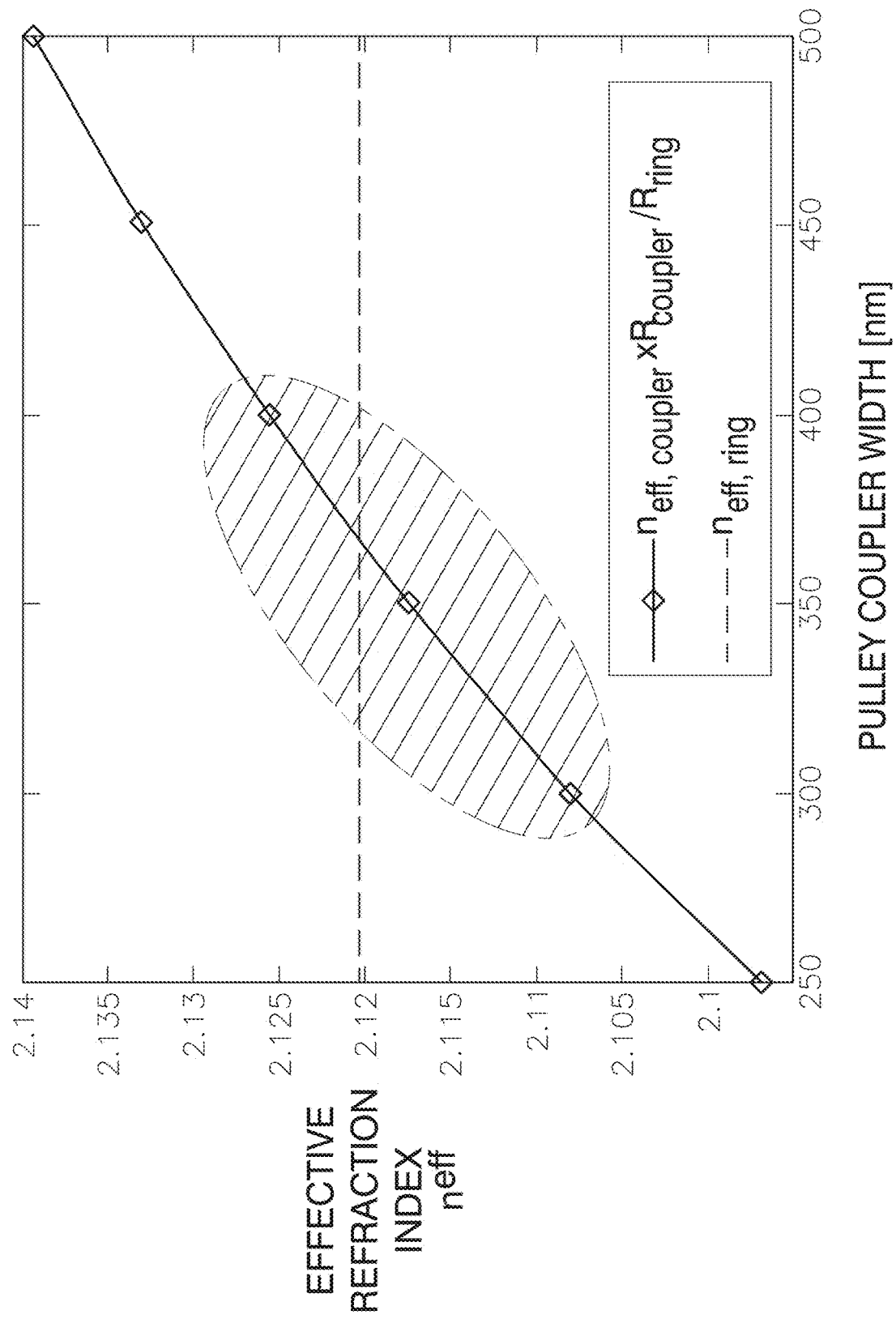
FIG. 5B is a graph illustrating simulated effective refraction indices of quasi TM00 mode at 775 nm for microring waveguide and pulley coupler waveguide.

Based on the four criteria listed hereinabove, an example of optimizing second-harmonic generation (from 1550 nm to 775 nm) in a PPLN microring resonator is provided for illustration. First, a 700 nm Z-cut LNOI wafer is used, and the waveguide width W1 and the radius R1 of the microring are selected to be 1.6 µm and 55 µm, respectively. Due to fabrication limitations, the etched depth and sidewall angles are about 430 nm and 70°. These microring parameters will allow for Q over $10^7$ for quasi-TM00 cavity modes for both 1550 nm and 775 nm. Their simulated mode profiles are shown in FIG. 4, indicating good mode confinement and nearly ideal mode overlapping (>90%). The top-width of the waveguide is fixed at 1.6 µm and the etched depth is 430 nm, with a 270 nm remaining LN slab and a 70° sidewall angle. Once such parameters are fixed, an appropriate poling period L is calculated to satisfy the phase matching condition, as indicated by the alternate dark region with period of L in FIG. 2. The required periods are calculated for different radii of the microring 10 shown in FIG. 5A. Here, for the R1=55 µm case, the period is about 3.85 µm. Afterwards, the coupling gap and the width of the pulley waveguide 12 are calculated according to the same geometry of the microring 10. To avoid heat accumulation issues in the coupling region during the etching process, a relatively large coupling gap of 500 nm is selected. Based on that, the optimal pulley coupler width is simulated to be 300-400 nm as shown in FIG. 5B. A set of fabrication procedures are developed to realize the above design and described in the Example sections below.

Figure 11A:
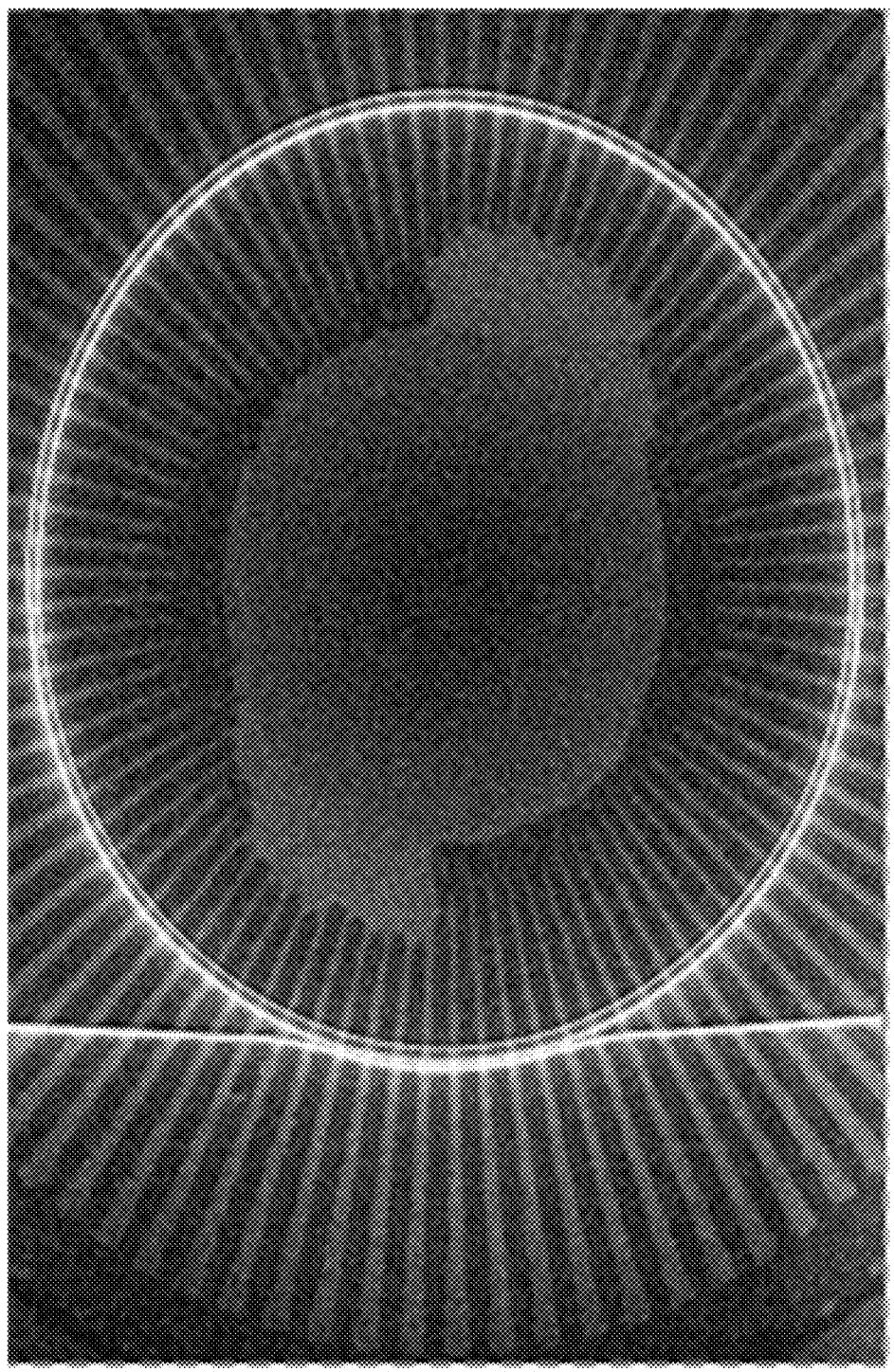
FIG. 11A is a scanning electron microscopy (SEM) image of a device fabricated in accordance with an embodiment of the present invention.
Figure 11B:
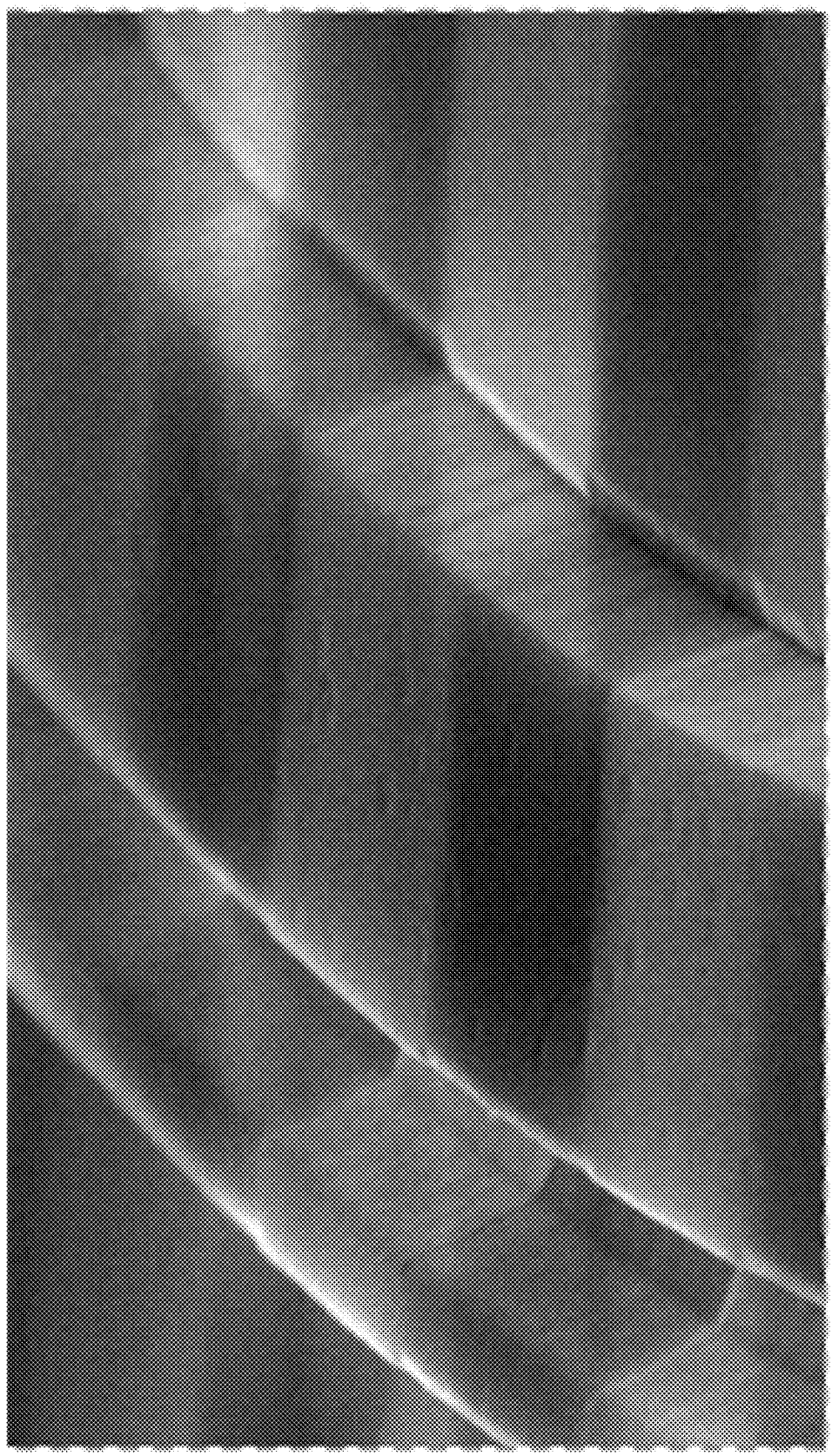
FIG. 11B is a magnified SEM image on the coupling region of the device of FIG. 11A.
Figure 12A:
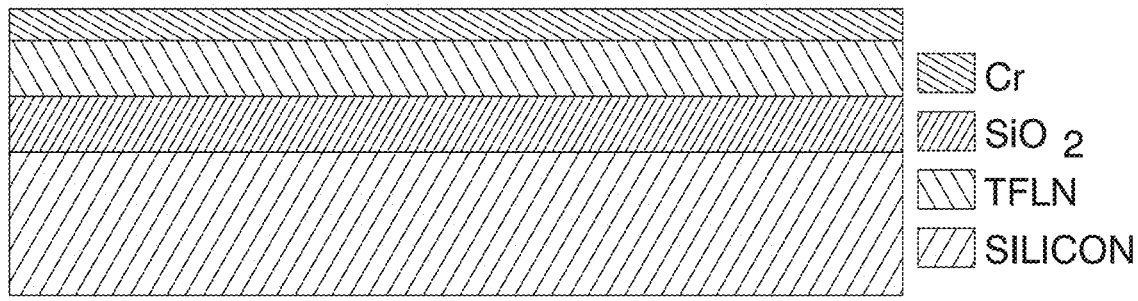
FIGS. 12A-12H are a series of schematic images illustrating manufacturing steps of a chemical-mechanical-polishing assisted PPLN microring resonator.
Figure 12B:
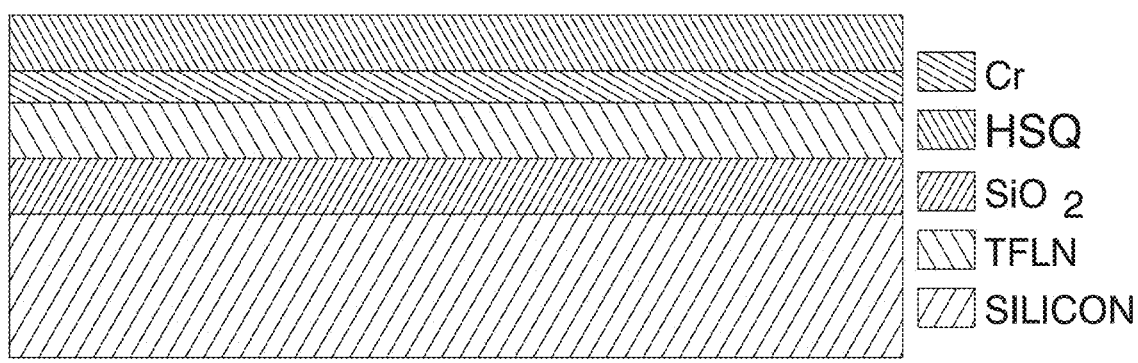
Figure 12C:
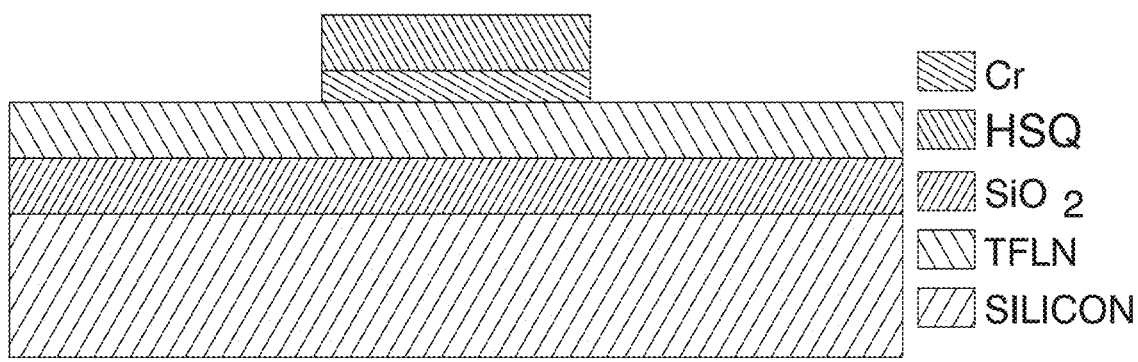
Figure 12D:
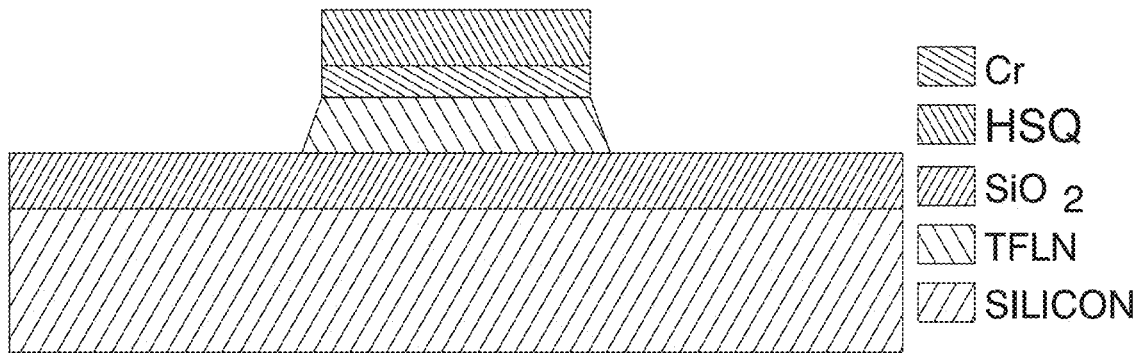
Figure 12E:
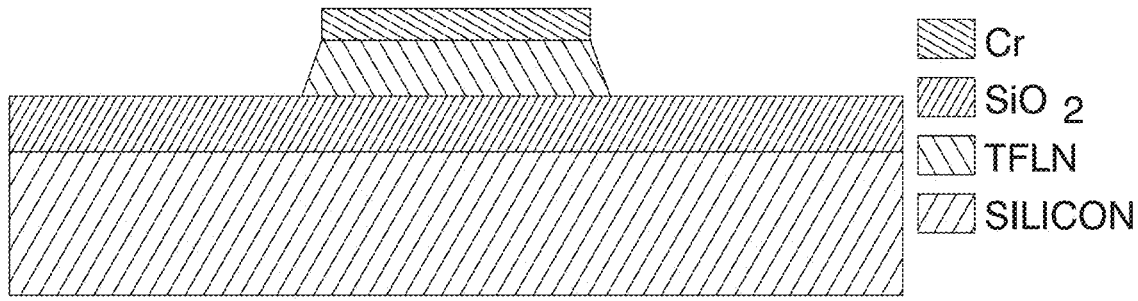
Figure 12F:
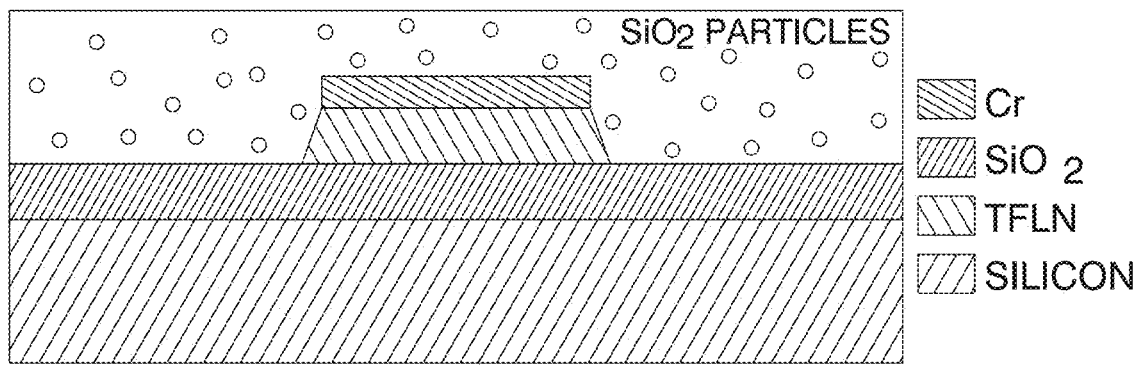
Figure 12G:
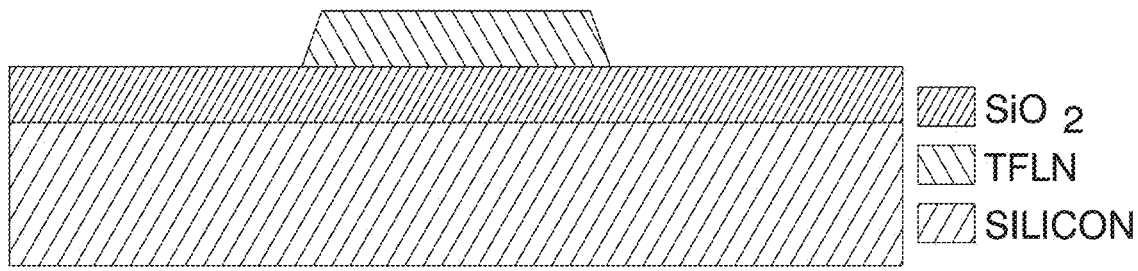
Figure 12H:
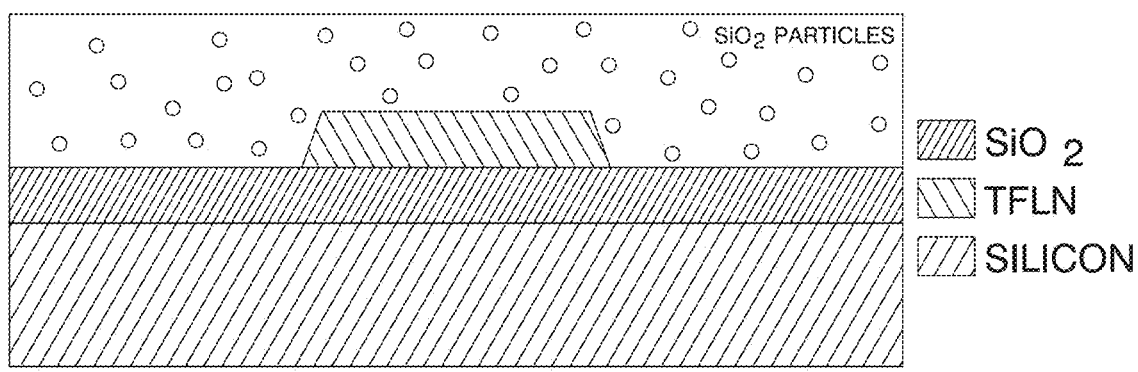
Figure 13A:
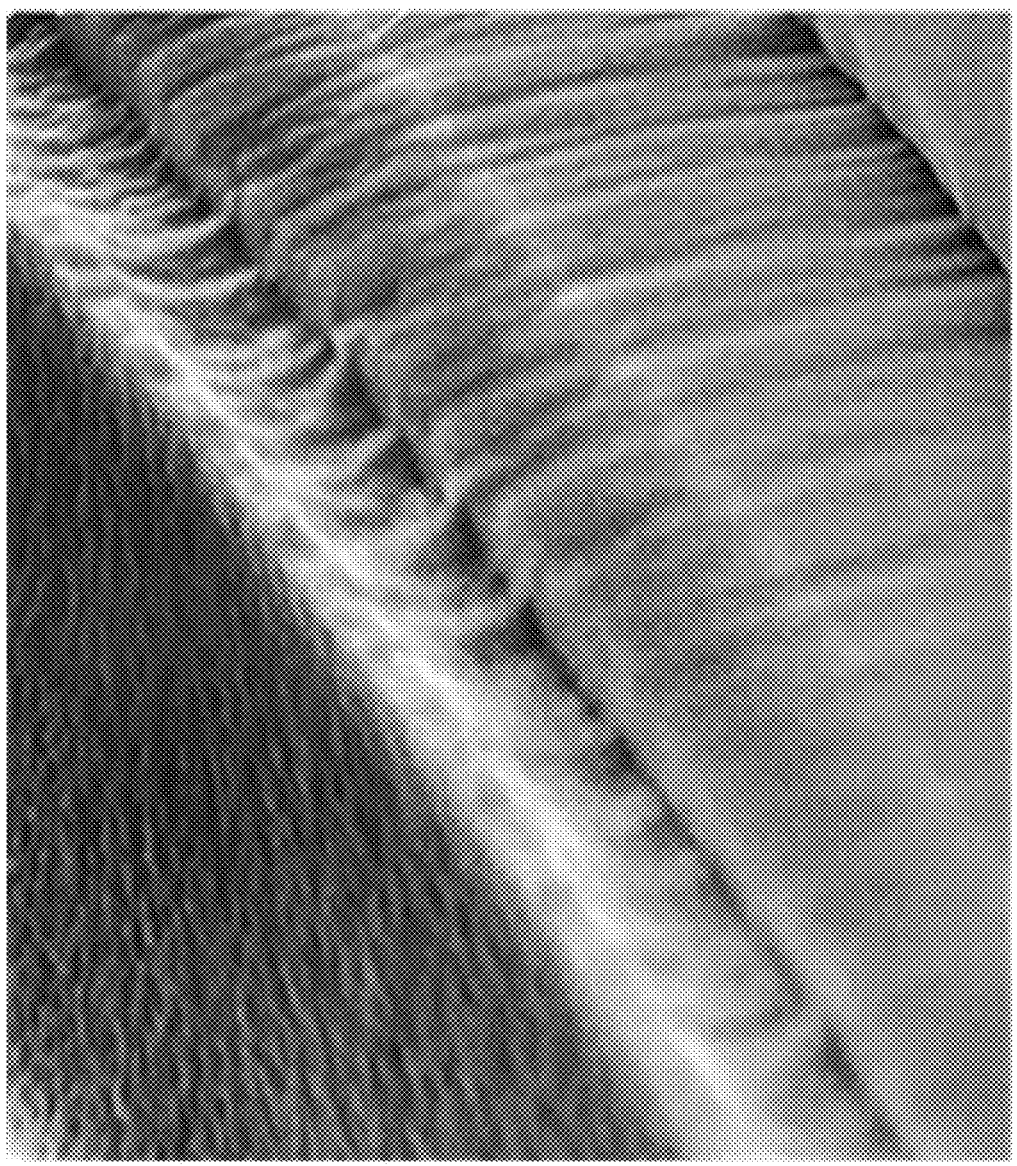
FIGS. 13A-13D are sample SEM images of the sidewall of a microring made in accordance with an embodiment of the present invention, as a result of, respectively, the steps shown in FIGS. 12E-12H.
Figure 13B:
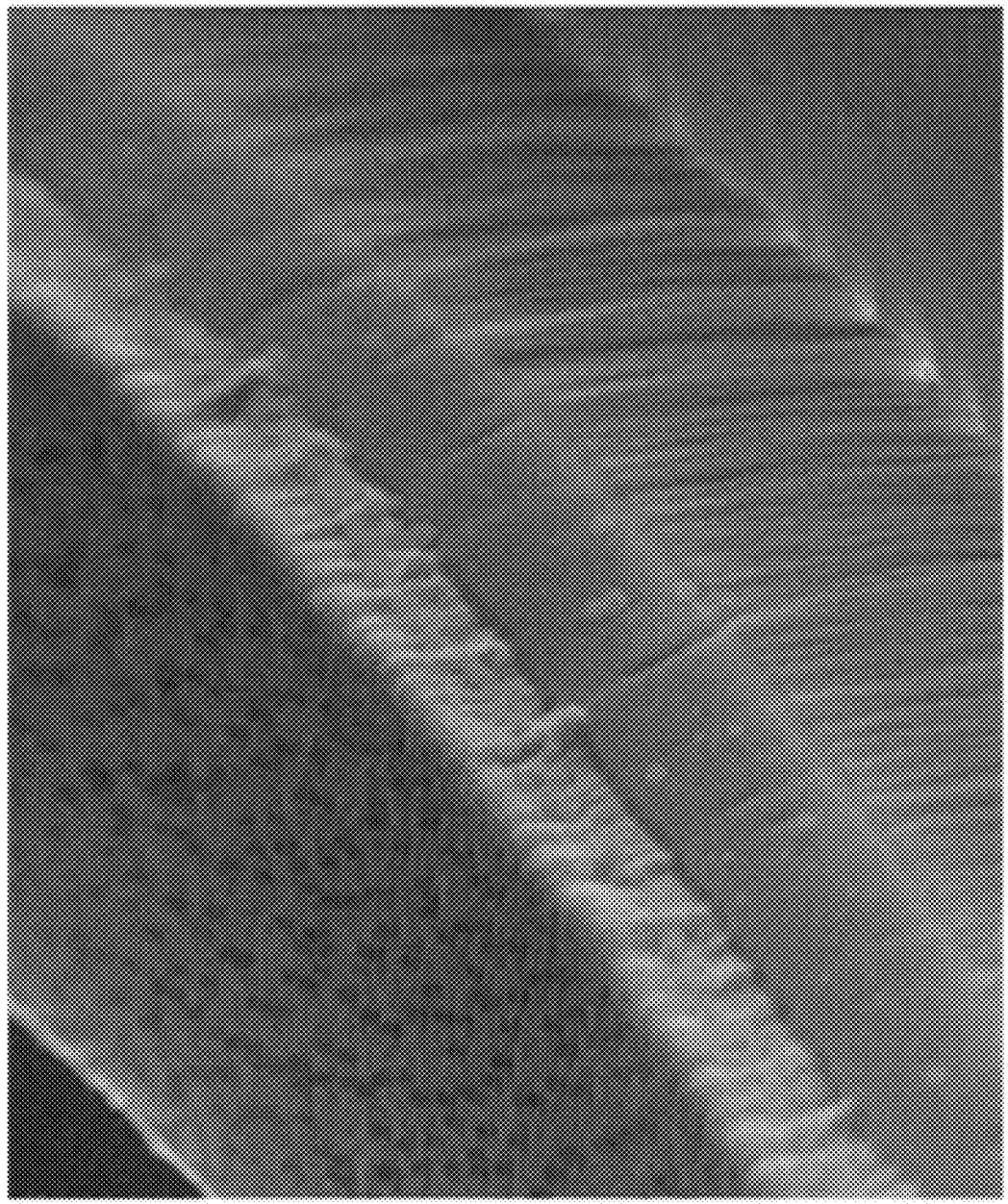
Figure 13C:
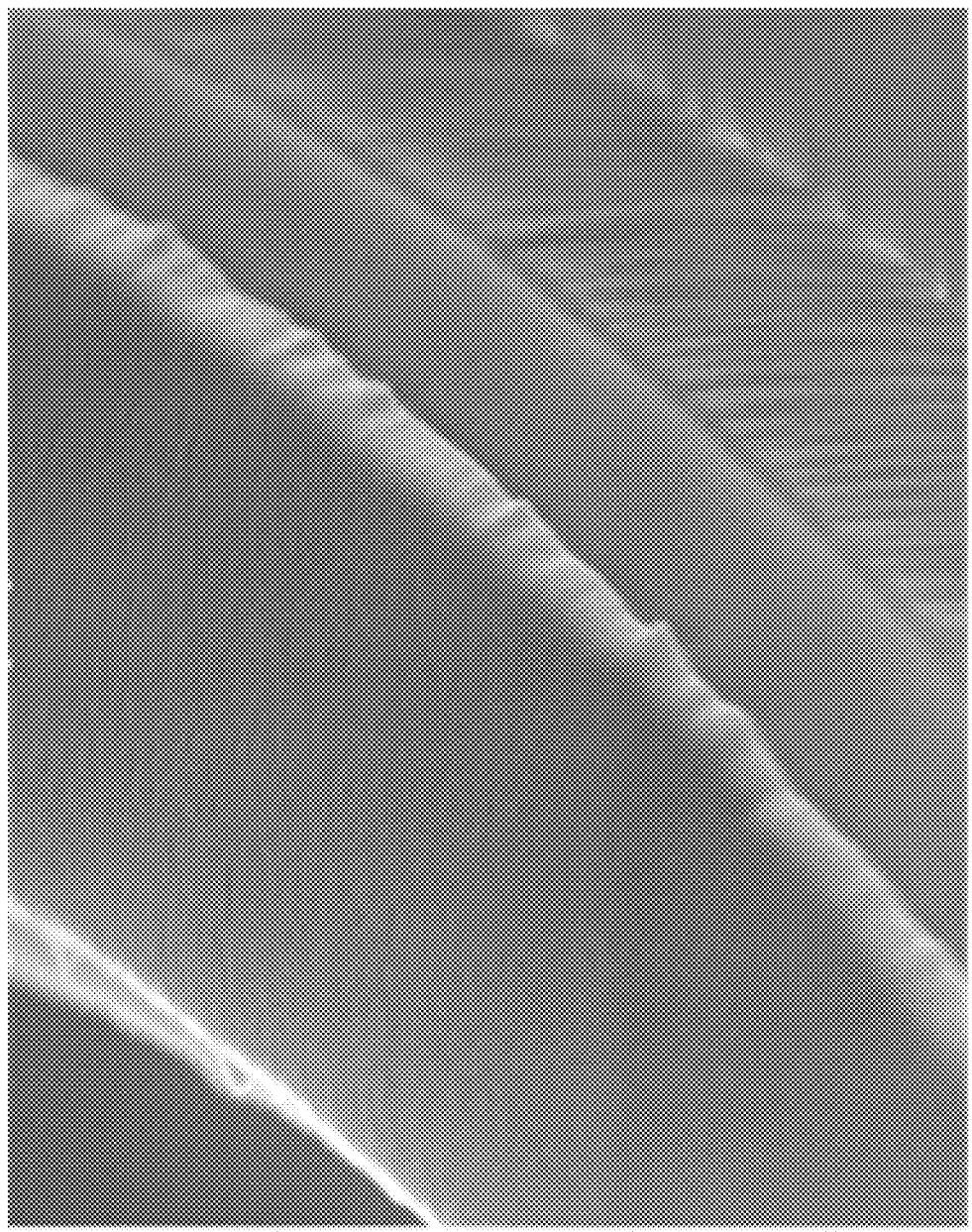
Figure 13D:
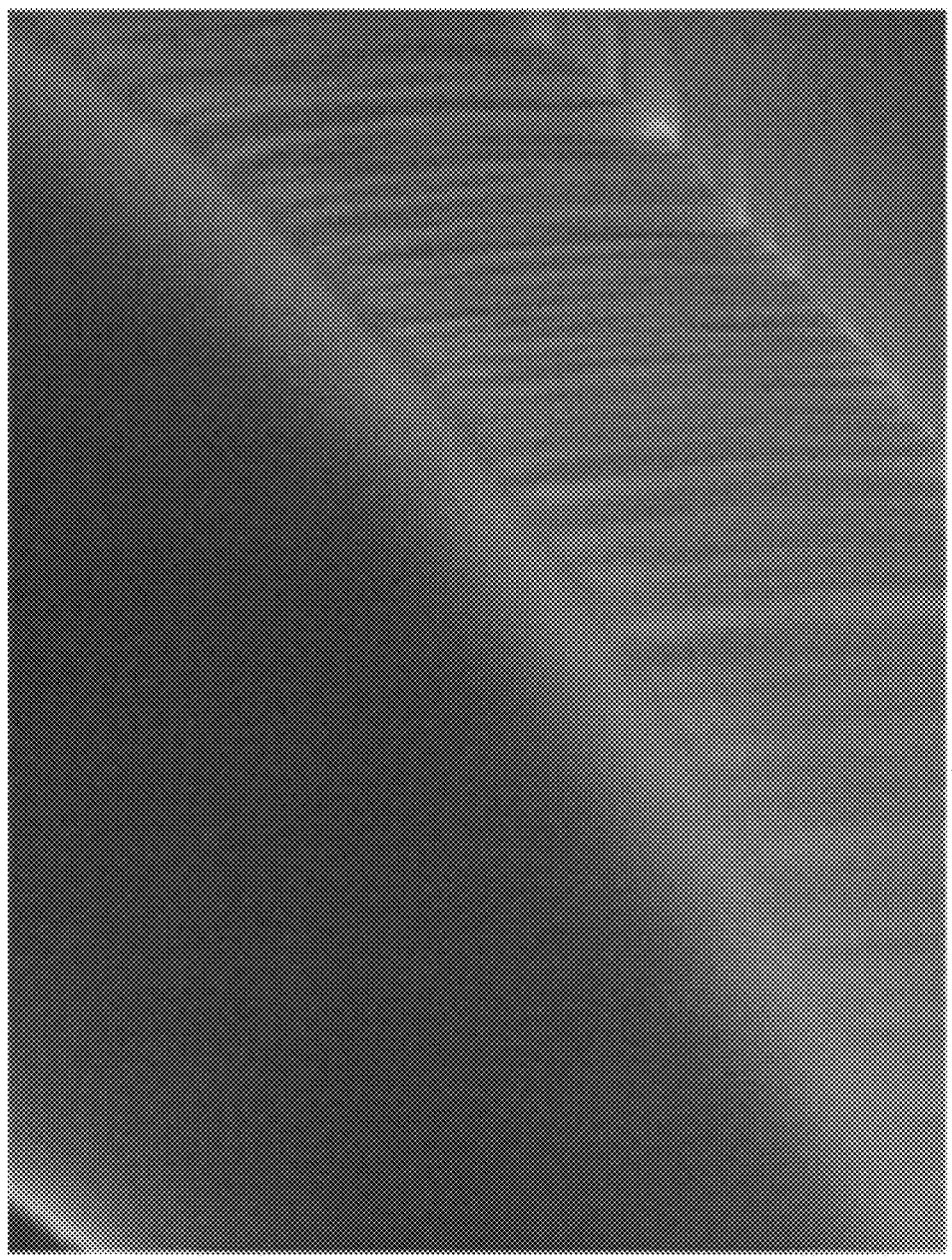

The loaded quality factor of the device may be limited in some cases by the surface roughness due to the poling process, as shown in FIG. 11B. A chemical-mechanical-polishing (CMP) process may be introduced to further smooth the surface roughness after fabricating the nano-structures. In this manner, the upper-cladding silicon oxide layer can be thinned down to the height level of the etched structures by coarse polishing. And fine polishing may be used to gradually smooth the surface roughness of LN structures to sub-nanometer level. This proposed technique may improve current Q to over $10^7$ and thus help to achieve the single-photon level nonlinearity.

Figure 6B:
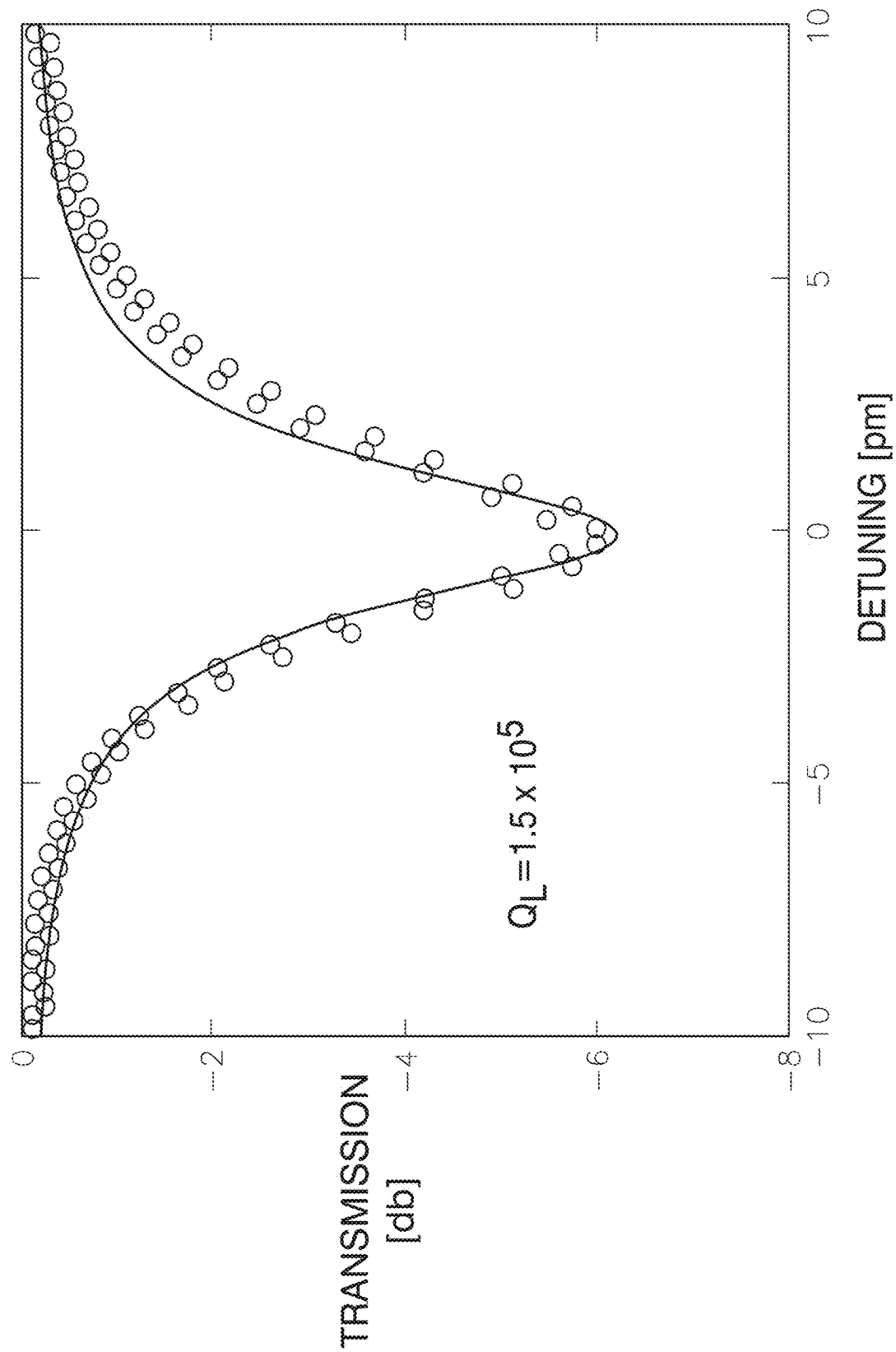
FIG. 6B is a resonance spectrum of visible quasi-TM00 modes around 777.2 nm.
Figure 7A:
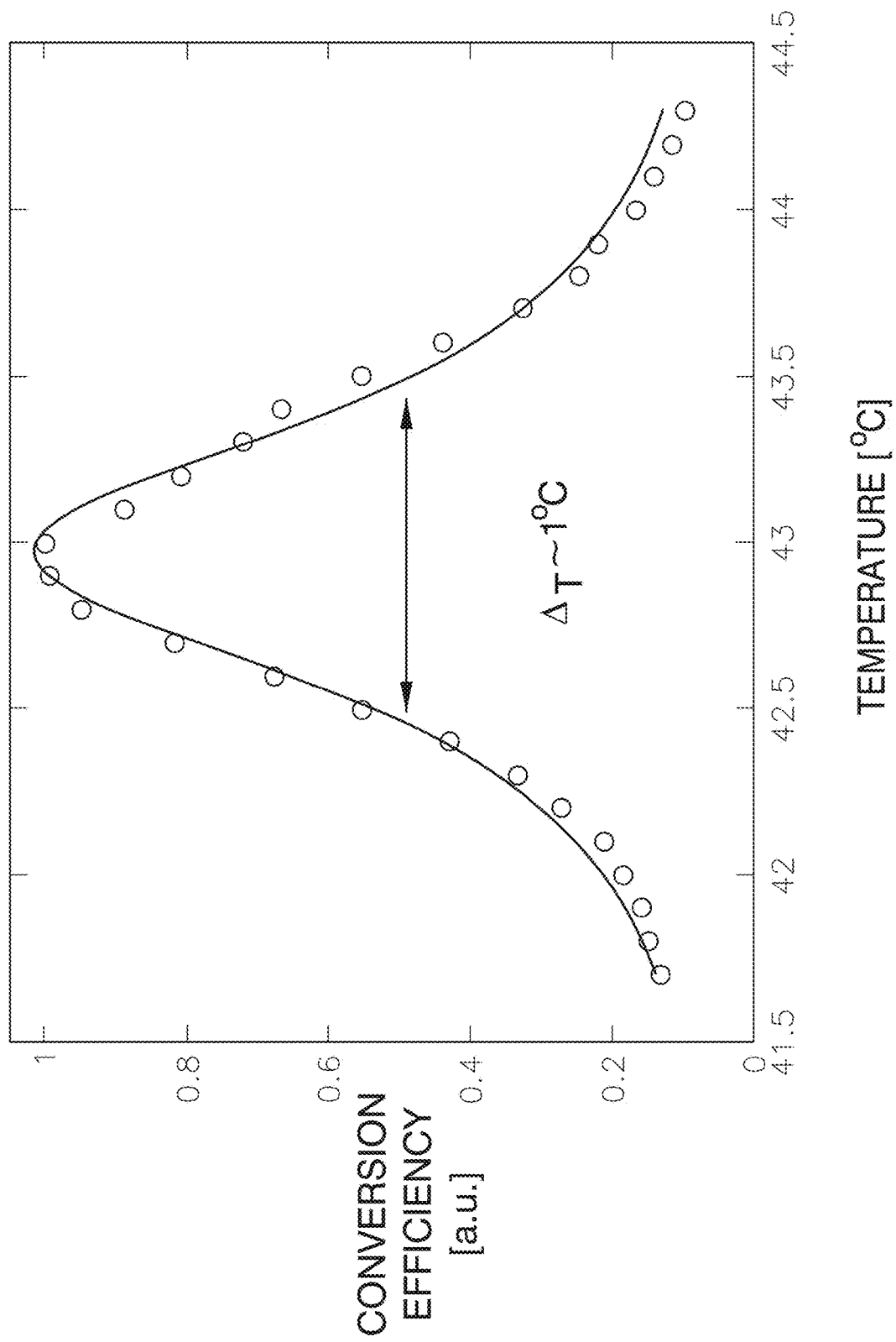
FIG. 7A is a graph showing temperature dependency of SHG efficiency, with Lorentzian-fitted temperature bandwidth at 1° C.

To verify the performance of the fabricated Z-cut PPLN microring resonators, the following parameters are to be characterized: the quality factors of quasi-TM00 cavity modes for the infrared light and the generated visible light, and the SHG efficiency and its temperature dependency. In a typical process, telecom (Santec, TSL 550) and visible (Newport 6712) sweep laser systems are used to measure the quality factor for infrared and visible cavity modes, respectively. In a sample device, the measured loaded quality factor $Q_L=1.3\times10^5$ (IR mode) and $QL=1.5\times10^5$ (visible mode) are shown in FIG. 6. A pulley waveguide (top-width 300 nm, gap 500 nm) is fabricated as the ring-bus waveguide coupler to attain simultaneously good coupling for both IR (90%) and visible light (75%). Next, to measure the non-linear conversion efficiency, a polarized (quasi-TM) tunable laser (Santec 550) is used as the pump for the second-harmonic generation. Two tapered fibers (OZ optics, 2 µm spot diameter) can be used to characterize fiber-chip-fiber coupling. By sweeping the infrared laser and fine tuning the device's temperature, a quasi-phase matched SHG is achieved for an optimal resonance mode at 1554.4 nm and its second-harmonic (SH) light at 772.2 nm at 43.0° C. With 21 µW pump power in the input fiber, 14 nW SH power is collected in the output fiber. Accounting for coupling loss, the normalized SHG efficiency is estimated to be $\eta_{sh}$=340,000%/W. FIG. 7A plots the temperature dependency of the SHG efficiency for the optimized cavity mode (around 1554.4 nm), showing a temperature tolerance of 1° C.

Subsequently, the single-photon nonlinearity of the device is calculated according to equation (1). In the case of SHG, for example, it is assumed that both 1550 nm and 775 nm cavity modes are critically coupled and have the same Q. In FIG. 7B, the shallow region indicates previously demonstrated high Q in lithium niobate microring resonators. The Z-cut PPLN microring is compared with various nonlinear on-chip resonators with respect to their state-of-the-art single-photon nonlinearity. This indicates the present invention has advantages in achieving large single-photon non-linearity. With further improvement in loaded quality factor, QL into the parameter region marked in FIG. 7B, the achievable single-photon nonlinearity with the proposed design will approach unity.

The above example is given specifically for SHG. In some embodiments, similar processes are implemented for SFG for single photons. For example, instead of using a single pump, two pumps may be used, one at 1552 nm and the other at 1548 nm. Because the two pumps are close to 1550 nm, their cavity characteristics, such as coupling strengths into and from the cavity, the cavity Q factors, spatial mode sizes, etc. will be nearly identical to that of 1550 nm. A nearly identical single-photon nonlinearity is expected for the SFG process as with the SHG process, as long as all the inter-acting waves (each at 1552 nm, 1550 nm, and 775 nm) are all resonant with the cavity.

In some embodiments, a similar SFG process can be realized between two pump photons of two wavelengths that are quite different. For example, the two pump photons can each be in the telecom C band and O band, or each in the telecom band and the visible band, or each in the mid-infrared band and the visible band. The disclosed technique applies to all of these situations, and the same design and fabrication steps may be adopted as in the above example for SHG.

In some embodiments, different materials, such as gallium phosphide (GaP) and gallium arsenide (GaAs), could be used to achieve strong optical nonlinearity by using high quality factor nano/micro cavity resonators.

In some embodiments, the width and thickness of the waveguides may be changed to achieve phase matching conditions and modify group velocity dispersion (GVD) for different optical wavelengths, or for other applications.

In some embodiments, the thickness of the LN layer 14 will vary from 700 nm, and the etching depth may vary from 430 nm.

In some embodiments, the coupling gap or pulley waveguide width can be modified to optimize coupling for different wavelengths and different radii of the microring.

In some embodiments, an additional pulley coupler may be added to form an add-drop scheme for certain other applications.

In some embodiments, various working temperatures, or materials, of the heating plate described hereinbelow can be used so as to optimize the periodical poling process.

In some embodiments, the poling pulse configuration parameters, such as duration time and voltage, can be different to optimize the periodical poling process.

In some embodiments, the poling process could be carried out after forming microring structures to avoid further degradation of the sidewall and/or surface roughness.

In some embodiments, the inversion of ferroelectric domain in the poling process could be also realized through piezo force microscopy (PFM), electron beam, or focused ion beam (FIB) methods.

In some embodiments, coupled microring resonators with single-photon nonlinearity in one microring can be used to realize unconventional photonic blockade for generating high quality single photons without the need of signal heralding.

In some embodiments, a microring with single-photon nonlinearity could be designed to realize deterministic generation of entangled photon sources.

In some embodiments, a network of such microring resonators with single-photon nonlinearity can be used to implement quantum photonic computing.

Figure 8:
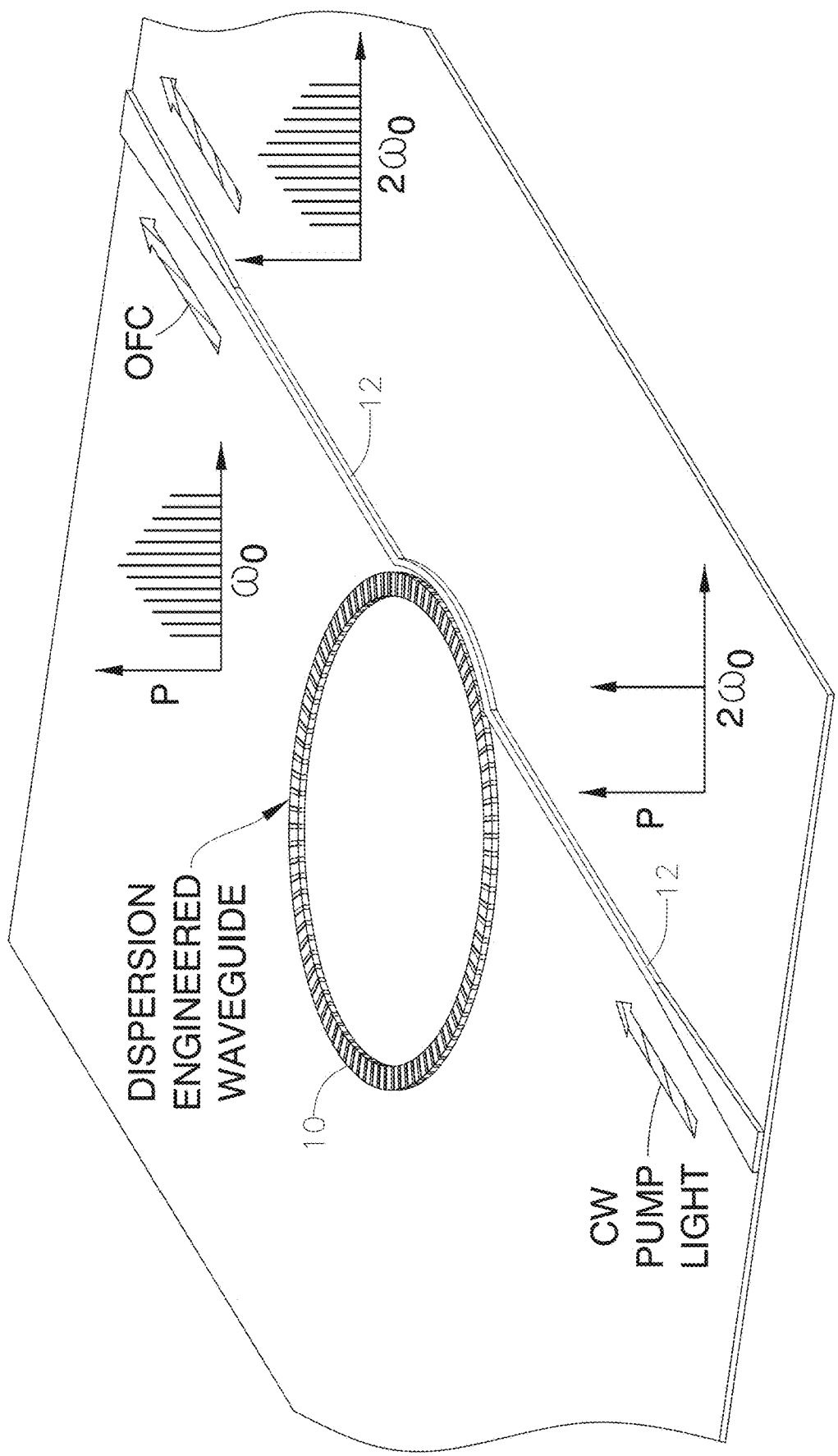
FIG. 8. is a schematic diagram showing quadratic soliton generation.

In some embodiments, the proposed PPLN microring resonator 10 can be used to exploit different nonlinear processes, such as SFG, DFG, OPA, OPO, etc. For example, as shown in FIG. 8, such devices can be used to generate a quadratic soliton. Continuous-wave (CW) pump light with a single frequency $2\omega 0$ may be coupled into the microring 10 and start to generate new frequencies of light around $\omega 0$ via an OPO process. Due to the strong single-photon nonlinearity inside the cavity, other nonlinear processes, such as SHG, SFG and DFG, will also occur efficiently, thus creating even more frequency components around both $\omega 0$ and $2\omega 0$. By carefully-designed waveguide dispersion, one could achieve octave-spanning frequency combs, making the present invention a viable approach for this and similar applications.

Figure 9:
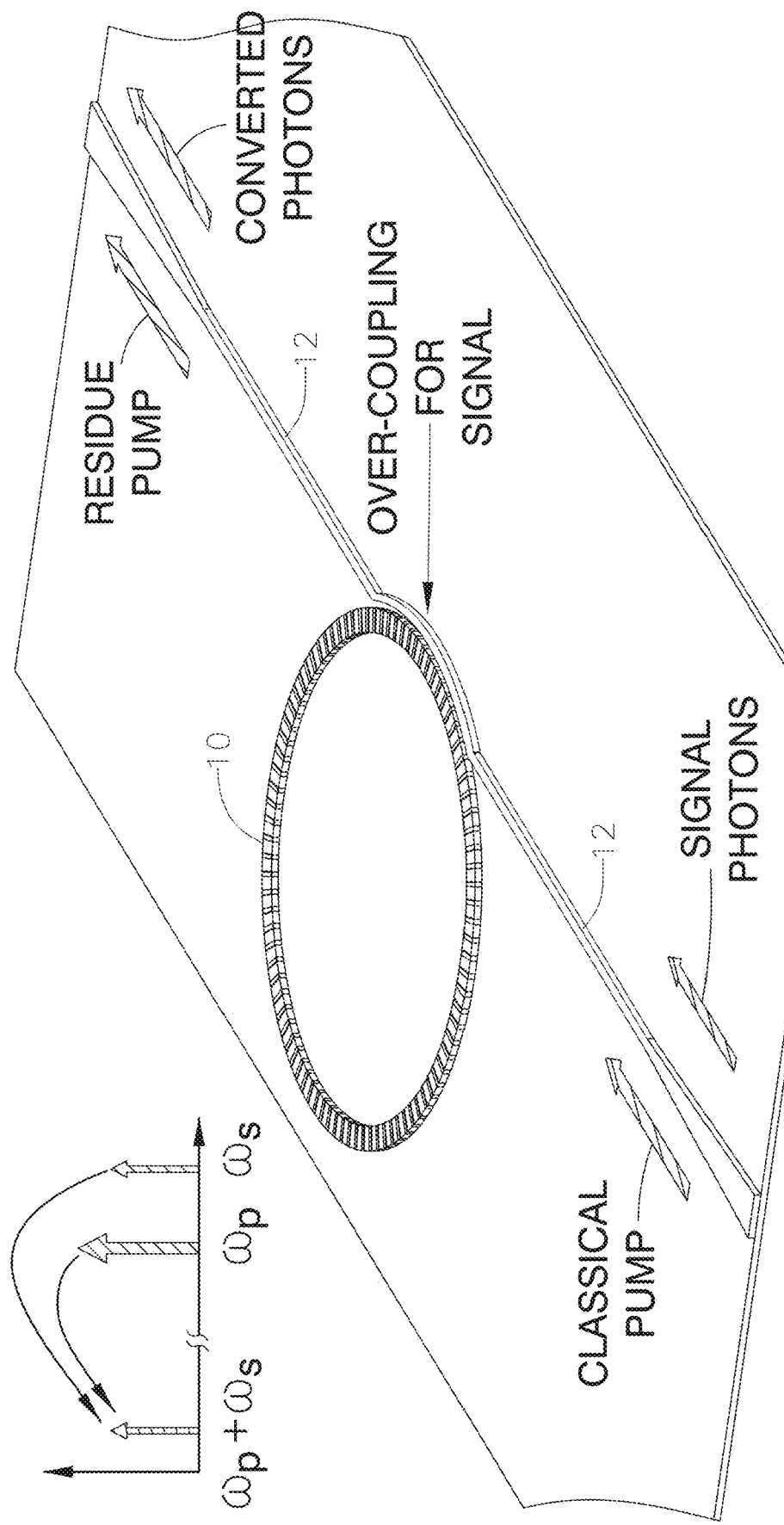
FIG. 9 is a schematic diagram of a quantum frequency converter.

In some embodiments, the proposed PPLN microring resonator can be used as a quantum frequency converter. As is shown in FIG. 9, with a classical pump $\omega p$ coupling into the microring 10, the incoming signal photons $\omega s$ (or those in quantum states at a single-photon level) can be converted to other frequencies ($\omega p+\omega s$) of photons through a low-noise SFG process. The strong single-photon nonlinearity lowers the required pump power, thus reducing the noise induced during the conversion process. Furthermore, the over-coupled design for signal and converted photons facilitates reduction of loss inside the cavity.

Example 1: Example Device Fabrication Procedures

The PPLN microring resonator design is fabricated on a lithium-niobate on-insulator wafer with a 700-nm Z-cut lithium-niobate thin film which is bonded on top of a 2-μm silicon oxide layer, supported on a 500-μm thick silicon substrate. The fabrication is composed of two parts: The first part is to fabricate the circular poling pattern. The second part is to carry out the in-house periodical poling process. The second part is done to fabricate nanostructures such as taper waveguides, bus waveguides, pulley couplers and microrings.

Figure 10A:
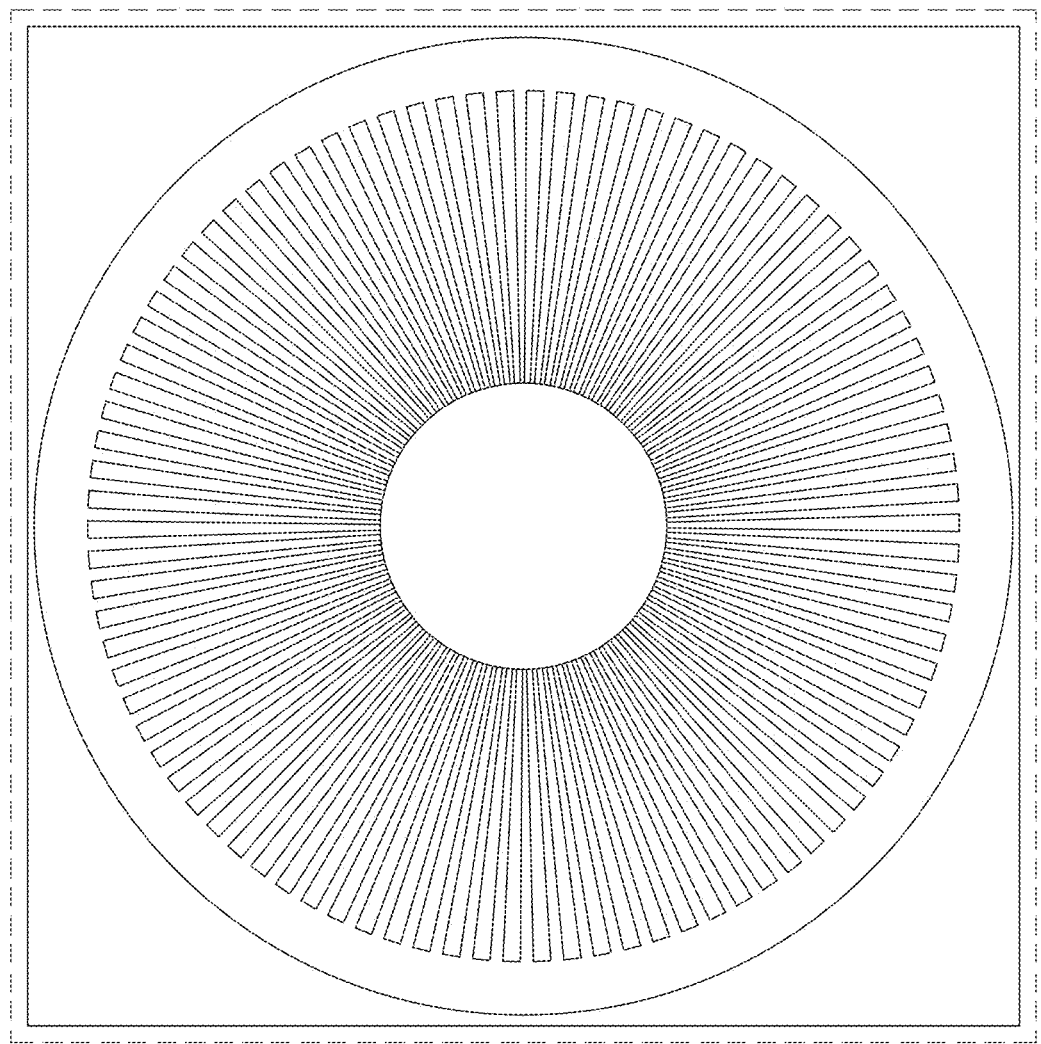
FIG. 10A is a schematic illustrating chromium and gold poling pads.

First, after standard piranha cleaning and dehydration, a 10×10 mm size LNOI chip sample is spin-coated with bi-layer electron beam resists (200-nm 495 PMMA A4 and 200-nm 950 PMMA A4). Following a subsequent pre-bake (2 mins, 180° C.) process, the circular poling electrodes are defined by electron-beam lithography (EBL, Elionix ELS-G100, 100 keV). After development (2 mins, MIBK:IPA, 1:3) and microscope inspection, 30-nm Cr and 60-nm Au layers are deposited via electron-beam evaporation (AJA e-beam evaporator). The desirable poling electrode pattern is then created by a metal lift-off process, as shown in FIG. 10A. The circular pattern is the chromium and gold poling pads.

Figure 10B:
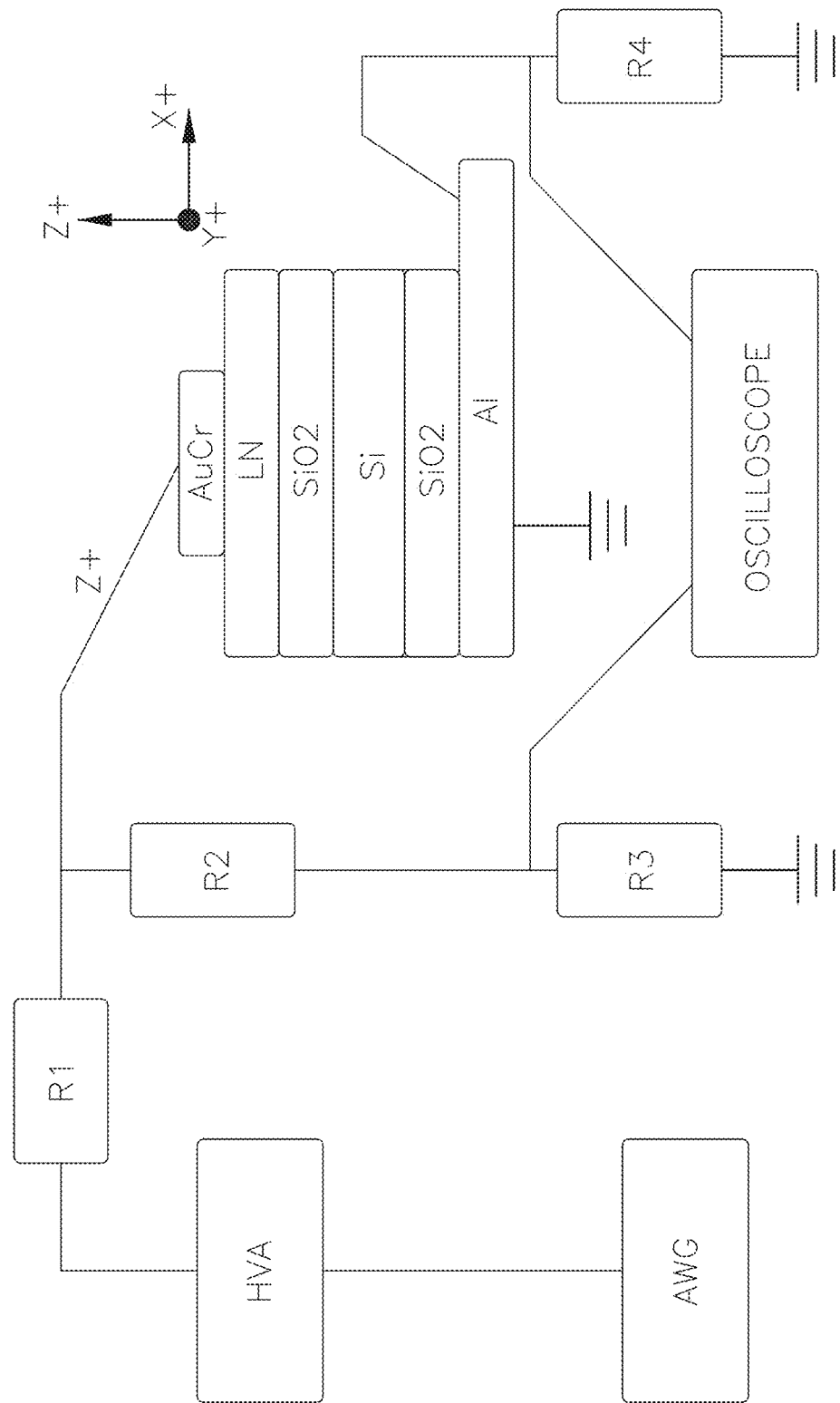
FIG. 10B is a schematic of a poling system for a Z-cut LNOI, high voltage amplifier (HVA) and arbitrary waveform generator (AWG)

Second, a home-build high-voltage system is designed for the periodical poling process. The sample with the poling pattern is placed on a heated (300° C.) aluminum plate after allowing for a 1 hr thermal stabilization time for the plate. Two electrical probes are connected to the surfaces of the poling pads and the aluminum plate, as shown in FIG. 10B, which serve as positive and ground, respectively. Resistors are selected as R1=150 k'Ω, R2=21 M'Ω, R3=2.2 M'Ω, R4=220 k'Ω, respectively. R4 here is invalid due to shared ground. Then a pre-programmed electrical pulse (1-ms duration time, 600 V) is sent through the sample to flip the crystal orientation and form the domain inversion region.

Third, a second EBL is carried out to define the nanostructures aligned with the poled region. An optimized ion milling process is used to etch the structures with smooth sidewalls and the optimum sidewall angle (70° to 80°). An RCA-I (5:1:1, deionized water, ammonia and hydrogen peroxide) bath for the removal of the redeposition is applied delicately to minimize the sidewall roughness due to the uneven removal rates for poled and unpoled regions. As shown in FIG. 11A, uniform periodic domain inversion along with fabricated structures are revealed under HF attack, which is crucial for high conversion efficiency. Later, the chip is clad with 2-μm silicon oxide via plasma-enhanced chemical vapor deposition (PECVD). Finally, the chip is cleaved and polished for light coupling.

Example 2: Example Device Fabrication Procedures

The PPLN microring resonator design is fabricated on a lithium-niobate on-insulator wafer with a 700-nm Z-cut lithium-niobate thin film which is bonded on top of a 2-μm silicon oxide layer, supported on a 500-μm thick silicon substrate. The fabrication is composed of three parts: The first part is to fabricate the circular poling pattern. The second part is to carry out the in-house periodical poling process. The third part is done to fabricate high quality factor ($Q\sim10^8$) microrings.

The first two parts are described in Example 1. The third part follows the procedures shown in FIGS. 12A-12H. A hard mask (Chromium, or SiO2 and SiN) is deposited on the poled LN layer via a sputter or PECVD process. Subsequently EBL writing is performed on hydrogen silsesquioxane (HSQ) resist, aligning to the predefined poling region. A hard mask etching process and an optimized ion milling process are used to first open the hard mask and then etch the structures with smooth sidewalls and the optimum sidewall angle. RCA-I bath is used for the removal of the redeposition. A chemical-mechanical-polishing (CMP) process is introduced to further smooth the surface roughness after fabricating the nanostructures. Silica slurry (20-50 nm particle size) is used in this CMP process to polish the sidewall of the fabricated structures. Afterwards, the top surface will be cleaned and polished by the second CMP process to further reduce the surface roughness. As shown in FIG. 13, it shows significant improvement on sidewall roughness of the fabricated microring, indicating ultra-high Q is potentially achievable by using CMP assisted process.

It will be understood that the embodiments described herein are merely exemplary and that a person skilled in the art may make many variations and modifications without departing from the spirit and scope of the invention. All such variations and modifications are intended to be included within the scope of the present invention as it is explicitly and inherently described hereinabove and as illustrated in the accompanying drawings.

What is claimed is:

1. A method for making a microring resonator, comprising the steps of:
   obtaining an optical non-linear wafer;
   fabricating a circular poling pattern on said wafer;
   forming a plurality of nanostructures on said wafer such that said plurality of nanostructures is communicatively coupled to said circular poling pattern; and
   forming a microring resonator on said wafer such that said microring resonator is communicatively coupled to said plurality of nanostructures and to said circular poling pattern.

2. The method of claim 1, wherein said plurality of nanostructures includes a waveguide.

3. The method of claim 2, wherein said waveguide comprises a bus waveguide.

4. The method of claim 1, wherein said plurality of nanostructures comprises a pulley-coupler.

5. The method of claim 1, wherein said wafer comprises lithium niobate.

6. The method of claim 1, wherein said wafer comprises gallium phosphide and/or gallium arsenide.

7. The method of claim 1, wherein said microring resonator is adapted to exploit a non-linear effect of said wafer.

8. The method of claim 7, wherein said non-linear effect is selected from the group consisting of: second-harmonic generation, difference-frequency generation, optical parametric amplification and optical parametric oscillation.

9. The method of claim 1, further comprising the step of depositing a cladding layer over said microring resonator or said wafer.

10. The method of claim 1, further comprising the step of cleaving and polishing said wafer.

11. The method of claim 1, wherein said circular poling pattern is formed via electron-beam lithography, and wherein said plurality of nanostructures is formed through application of a periodical poling process to said wafer.

* * * * *